(12) United States Patent
McAvoy et al.

(10) Patent No.: US 8,311,474 B2
(45) Date of Patent: Nov. 13, 2012

(54) ACTIVITY BASED SYSTEM AND METHOD FOR CHARGING STUDENT ACCOUNTS

(75) Inventors: Glenn McAvoy, Lutherville, MD (US);
Brad Adams, Rockville, MD (US);
Duane Viazanko, Lutherville, MD (US);
Stu Finnigan, Glenelg, MD (US)

(73) Assignee: Educate Online Technology, LLC, Baltimore, MD (US)

( * ) Notice: Subject to any disclaimer, the term of this patent is extended or adjusted under 35 U.S.C. 154(b) by 0 days.

(21) Appl. No.: 11/730,568

(22) Filed: Apr. 2, 2007

(65) Prior Publication Data

US 2008/0070220 A1    Mar. 20, 2008

Related U.S. Application Data

(60) Provisional application No. 60/787,636, filed on Mar. 31, 2006.

(51) Int. Cl.
*G09B 7/00* (2006.01)
*G06Q 50/00* (2012.01)

(52) U.S. Cl. ........ 434/350; 705/326; 434/308; 434/322; 434/336

(58) Field of Classification Search .................. 434/350, 434/396, 156, 308, 322, 323, 336; 709/217; 705/326
See application file for complete search history.

(56) References Cited

U.S. PATENT DOCUMENTS

| | | | | |
|---|---|---|---|---|
| 6,347,333 | B2 * | 2/2002 | Eisendrath et al. | 709/217 |
| 6,358,053 | B1 * | 3/2002 | Rosenfield et al. | 434/156 |
| 2002/0013836 | A1 * | 1/2002 | Friedman et al. | 709/223 |
| 2002/0064767 | A1 * | 5/2002 | McCormick et al. | 434/396 |
| 2002/0174041 | A1 * | 11/2002 | Grey et al. | 705/32 |
| 2003/0074668 | A1 * | 4/2003 | Carlin et al. | 725/95 |
| 2004/0033475 | A1 * | 2/2004 | Mizuma et al. | 434/219 |
| 2006/0034438 | A1 * | 2/2006 | O'3Neill | 379/114.07 |
| 2006/0194184 | A1 * | 8/2006 | Wagner | 434/350 |

OTHER PUBLICATIONS

International Application No. PCT/US2007/008294—PCT International Search Report and Written Opinion of the International Searching Authority mailed Sep. 8, 2008.

* cited by examiner

*Primary Examiner* — Kang Hu
(74) *Attorney, Agent, or Firm* — Faegre Baker Daniels LLP

(57) ABSTRACT

A system for charging one or more learning session to one or more student accounts comprises an online learning system having one or more nodes that creates one or more online learning sessions over one or more communications channels between one or more students and corresponding teachers. An enrollment node receives student enrollment information. A scheduling node schedules the online learning session. A database that stores information relating to one or more charge criterion information for charging the one or more learning sessions to the one or more student accounts based on communications channel activity. An activity node receives communications channel activity information associated with one or more learning sessions, and an accounting node associates a charge information for a learning session to the student account based on the channel activity information and one or more charge criterion information. The charge information for the learning session is associated with the student account based on a determination of whether one or more communications channel activity associated with the learning session satisfy the one or more charge criterion.

5 Claims, 29 Drawing Sheets

Hi Annie!

Your next session is
Monday 3/26/2007 11:32 AM

You can click the RE-ENTER SESSION
button to re-enter your session at any time.

MATH

RE-ENTER SESSION — 922

Great h=Job! You have 1898 tokens!

Solve one and two step word problems involving any combination of basic operations on whole numbers, decimals, and fractions Exercise Solve each problem 1. Joy and Brad made 1.750 liters of ice cream and placed it into containers that have 0.125-liter capacity. If they sell each container for $3.25, how much money might they earn?

Completed sessions:
There are no previous sessions today

Your schedule:
You do not have any sessions assigned this week. If you feel this is an error please call 1-877-600-4851 to speak with an Education Service Supervisor.

Upcoming sessions:
There are no upcoming sessions today

Sign up for more sessions

Your next session: 11:32 – 12:32
Students
Annie Math    Math
Begin session —1022

3/26/2007
11:37 AM

Logout

Ms. Adams | Annie Math

Master Test Answer Key for ILO#6P53

Solve one and two step word problems involving any combination of basic operations on whole numbers, decimals, and fractions Problems 1: $45.50
 ○ Correct
 ○ Incorrect
 ○ Not Attempted 2: 2 ½ ft
 ○ Correct
 ○ Incorrect
 ○ Not Attempted 3: 7.5 hours
 ○ Correct
 ○ Incorrect
 ○ Not Attempted 4: 11/12 miles
 ○ Correct
 ○ Incorrect
 ○ Not Attempted

_1042_

_1044_

_1046_

Solve one and two step word problems involving any combination of basic operations on whole numbers, decimals, and fractions Exercise Solve each problem 1. Joy and Brad made 1.750 liters of ice cream and placed it into containers that have 0.125-liter capacity. If they sell each container for $3.25, how much money might they earn?

FIG. 10C

Catapult Online Parent Home Page for Mom Math

Parent Website
1122
My Child's Account

Madison Math
Grade  10
Tokens  84

View/Change Schedule

View Student Progress

View Academic Reports

Change My Child's Password

Catapult Online Support

Change My Password

Change My Information

Policies and Procedures

Getting Started

Comments and Suggestions

Home Page

My Catapult Online Web Page

Hi Mom!

Welcome to you Catapult Online web page. Please take a few moments to review some of the useful functions you can do from this page using the buttons to the left.

View/Change Current Schedule – View your child's upcoming and permanent schedule, also add or reschedule sessions for you child by using this button. Educational research has proven consistent tutoring several times per week provides optimal gains for students.

View Academic Reports – Review your child's diagnostic testing reports and progress reports.

Change My Password - Change your password.

Change My Child's Password - Change your child's password.

Questions and Answers – Search our knowledge base or submit a question to our support team.

Also, be sure to check out Getting Started with Catapult Online and the Policies and Procedures section for important information.

ACTIVITY BASED SYSTEM AND METHOD FOR CHARGING STUDENT ACCOUNTS

CROSS-REFERENCE TO RELATED APPLICATION

This application claims the benefit of U.S. Provisional Patent Application Ser. No. 60/787,636, filed Mar. 31, 2006, which is incorporated herein by reference in its entirety. This application is related to U.S. patent application titled "HYBRID SYSTEM AND METHOD FOR OFFERING IN-CENTER AND ONLINE LEARNING SESSIONS", Ser. No. 11/730,563; U.S. patent application titled "RULE BASED SYSTEM AND METHOD FOR CHARGING STUDENT ACCOUNTS", Ser. No. 11/730,556; U.S. patent application titled "TEACHER ASSIGNMENT BASED ON STUDENT/TEACHER RATIOS", Ser. No. 11/730,567; U.S. patent application titled "TEACHER ASSIGNMENT BASED ON RESPONSIBLE AUTHORITY OR THIRD-PARTY ATTRIBUTES", Ser. No. 11/730,557; U.S. patent application titled "TEACHER ASSIGNMENT BASED ON TEACHER PREFERENCE ATTRIBUTES", Ser. No. 11/730,562; and U.S. patent application titled "EDUCATIONAL SYSTEM AND METHOD HAVING VIRTUAL CLASSROOMS", Ser. No. 11/730,561, all of which are filed concurrently herewith and are hereby incorporated by reference in their entirety.

BACKGROUND OF THE INVENTION

1. Field of Invention

The present invention relates generally to a learning system and method, and more particularly, to an online learning system and method.

2. Description of the Related Art

Individualized non-virtual and virtual learning environments are known. Learning centers have been used to provide individualized non-virtual learning environments to students in brick and mortar classes to achieve educational goals. It is demonstrated that students can excel and improve immensely from the individualized attention offered by private teachers in leaning centers. One such learning center is known as Sylvan Learning Center®, groups of which are managed and/or operated by franchisees and/or corporate entities. Managing and operating some learning centers involve hiring private teachers, performing various diagnostic-assessment tests of students' skill, prescribing individualized learning curriculums, conducting In-center learning sessions, tracking students' progress and making adjustments to prescribed curriculum. Efforts have been made to automate handwritten and paper-and-pencil testing using computer based systems. U.S. Pat. No. 6,146,148, titled "Automated testing and electronic instructional delivery and student management system," which is hereby incorporated by its entirety, discloses a computer-based diagnostic and prescriptive student assessment system for use in tutoring and supplemental education for expediting academic learning through skill gap closure.

Various types of known virtual learning environments (VLEs) are disclosed in U.S. Pat. No. 6,729,885 titled "LEARNING SYSTEM AND METHOD FOR ENGAGING IN CONCURRENT INTERACTIVE AND NON-INTERACTIVE LEARNING SESSIONS," U.S. Pat. No. 6,733,296 titled "LEARNING SYSTEM AND METHOD FOR HOLDING INCENTIVE-BASED LEARNING," U.S. Pat. No. 6,804,489 titled "LEARNING SYSTEM AND METHOD FOR TEACHER LOAD BALANCING," and U.S. Pat. No. 6,733,295 titled "LEARNING SYSTEM FOR ENABLING SEPARATE TEACHER-STUDENT INTERACTION OVER SELECTED INTERACTIVE CHANNELS," all of which are hereby incorporated by reference in their entirety.

In such VLEs, one or more teacher workstations and one or more student workstations are connected to each other over a network, e.g., the Internet, allowing teachers to send instructional material and content to students over the network. The teachers can also see what each student is doing on the display of the teacher workstation upon receipt of corresponding text or images from the student workstations. One or more databases accessible over the network store the instructional material along with other teacher, student and responsible authority data using suitably configured data formats and records. The learning environment within each learning session uses learning workspaces in the form of student or teacher workbooks, shared whiteboards, etc.

Also known are interactive learning sessions established within VLEs. During such learning sessions, teachers work on instructional material with students. Via interactive voice channels, for example, a teacher can orally interact with one or more students either independently or concurrently. Non-interactive sessions with students are held separately from interactive sessions. During non-interactive sessions, instructional material presented to the students does not require teacher interactions. A combination of interactive and non-interactive learning sessions can be held with a plurality of students, where a teacher can hold an interactive learning session with one student, while another student engages in a non-interactive learning session. The teacher can switch one or more students from interactive learning sessions to non-interactive learning sessions and vice versa as the teacher sees fit to accommodate students' educational needs.

One conventional VLE uses a client-server-computing model for creating various learning environments during learning sessions. The students and teachers can utilize wired and/or wireless devices that act as client workstations for one or more servers, which serve instructional material via the network. The students, student guardians, teachers and directors may be required to go through a log-in session before engaging in learning sessions or reviewing information such as student grades, progress reports, etc. Other arrangements that do not require a log-in session can also be used.

Web-site access and an intranet access has been used in the past to allow access for teachers, directors, students and parents. A teacher workstation can allow access to various electronic student information to which a teacher-only permission is applied for displaying information about students in upcoming sessions. The teacher workstation can allow access to teacher schedule data with links to a scheduling database that stores scheduling data. Known VLEs support web-sites where learning system participants, e.g., students, teacher, etc., can interact with each other through learning web sites. Examples of learning web sites include teacher site, director site, student site, and guardian or parent site.

Accounting systems that charge student accounts for attending learning sessions are known. However, with increasing sophistication of online learning systems there is a commensurate need to charge student accounts more intelligently.

SUMMARY OF THE INVENTION

Briefly, according to the present invention, a system for charging one ore learning session to one or more student accounts comprises an online learning system having one or more nodes that creates one or more online learning sessions over one or more communications channels between one or more students and corresponding teachers. An enrollment node receives student enrolment information. A scheduling node schedules the online learning session. A databases the stores information relating to one or more one or more charge criterion information for charging the one or more learning sessions to the one or more student accounts based on communications channel activity. An activity node receives communications channel activity information associated with one or more learning sessions, and an accounting node associates a charge information for a learning session to an student account based on the channel activity information and one or more charge criterion information.

According to some of the more detailed features of the present invention, the charge information for the learning session is associated with the student account based on a determination of whether one or more communications channel activity associated with the learning session satisfy the one or more charge criterion.

According to other more detailed features of the present invention, the communications channel activity information comprises at least one of a quantitative or qualitative measure of a communications channel parameter. A quantitative measure of a communications channel parameter relates to data rate, number of data units, number of received packets or number of transmitted packets. A qualitative measure of a communications channel parameter relates to data, voice, video or image quality parameter over a communications channel.

BRIEF DESCRIPTION OF THE DRAWINGS

These and other features and advantages of the invention will be further understood from the following detailed description of the embodiments of the invention with reference to the accompanying drawings, which show in:

FIGS. 6A-C show exemplary enrollment screens of an enrollment utility.

FIGS. 9A-C show exemplary screenshots of a student login screen, a student homepage, and a student learning session screen.

FIGS. 10A-C show exemplary screenshots of a teacher login screen, a teacher homepage, and a teacher learning session screen.

FIGS. 11A-B show exemplary screenshots of a responsible authority login screen and a responsible authority homepage.

DETAILED DESCRIPTION

Overall System Description and Definitions

Figure 1:
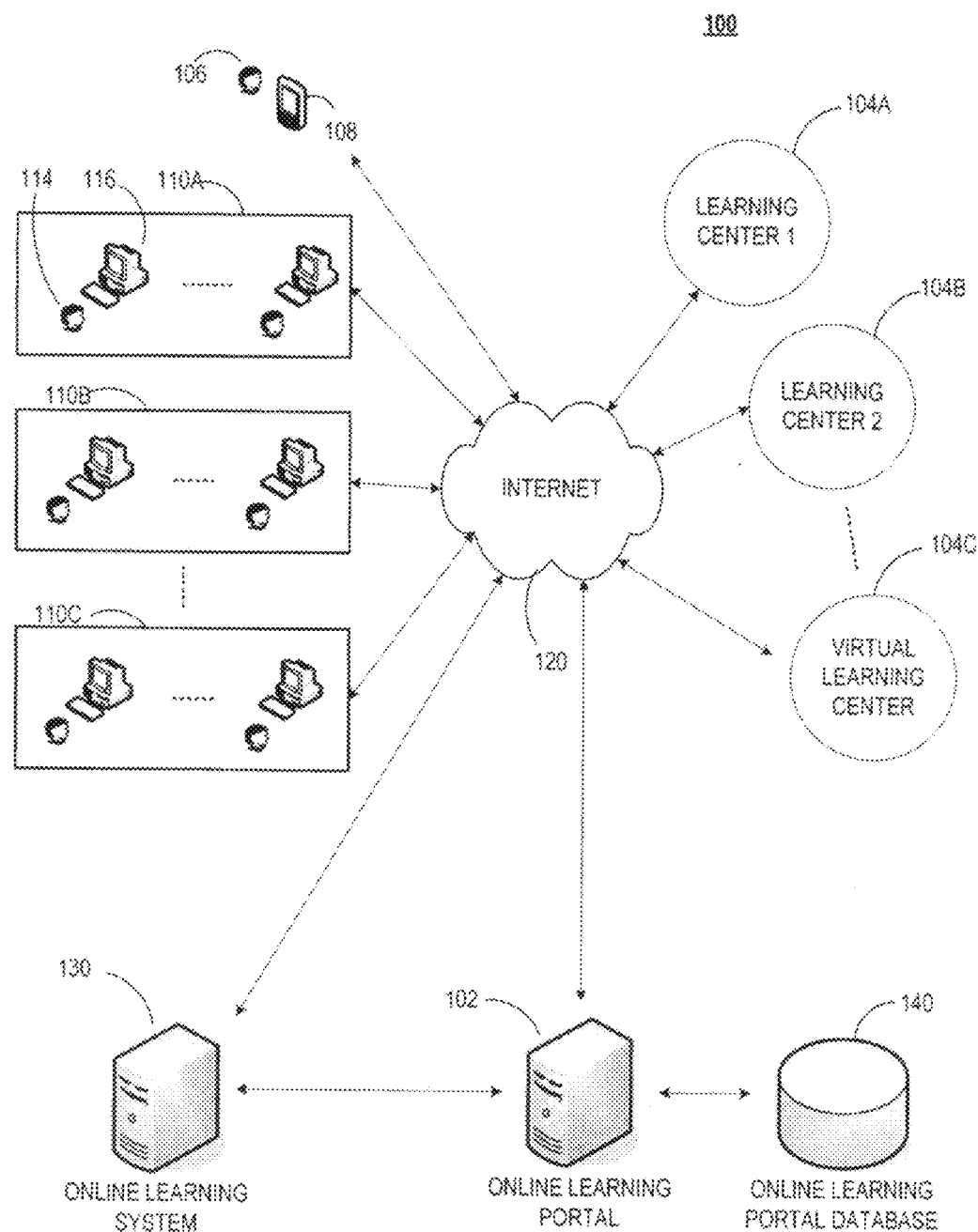
FIG. 1 shows a block diagram of a learning system according to one embodiment of the invention.

According to one aspect, the present invention relates to a hybrid system and method that combines in-center and online learning. One embodiment of the invention delivers instructional material for an educational program (e.g., courses, subjects, lessons, skills, etc,) during In-centre and online learning sessions that are scheduled for different instances of time. Another embodiment uses an intelligent based accounting system for charging online learning sessions to student account. Accounting can be rule based. Examples of rules are responsible authority rules or third party rules. Accounting can be activity based. Activities can be student activities or channel activities. Student activities relate to student conduct towards a learning session, (e.g., "no show," "late," "short" etc.). Channels activities can be qualitative or quantitative (e.g., data rates, bit rate, packet monitoring an detection, etc.). Another embodiment uses intelligence based matching for increasing revenues and reducing operating cost. Learning session matching can be based on teacher qualification for teaching different student/teacher ratios. In still another embodiment, teachers are matched based on student or teacher preference parameters. In yet another embodiment, teachers are matched based on responsible authority or third party rules and requirements. Another aspect of the system and method of the invention places matched teachers and students in interactive community rooms before delivering instructional material during scheduled learning sessions.

A learning system and method according to the present invention creates one or more learning environments in one or more learning center and/or over a network. A learning center comprises any environment that has an administrator for enrolling students for instructional purposes. A network comprises a plurality of privately or publicly connected nodes that are enabled to exchange information over one or more links. A virtual learning center comprises any computer-simulated learning center created over a network. Exemplary networks comprise any one or more of WANs, LANs, PANs, Internet or Extranets. The Internet is a collection of interconnected (public and/or private) networks that are linked together by a set of standard protocols to form a global, distributed network. A node comprises any one or more of unit(s) (software or hardware or both) or device(s) anywhere in the network that processes information an/or performs an attributed function. Example of nodes include server nodes, client nodes, computer nodes, processing node, communication nodes, work stations, PDAs, mobile devices, data entry node, scheduling node, accounting node, matching node, instructional delivery node, teacher selection node, etc. The nodes can be connected to each other according to any suitable network model, including but not limited to client server models as well as a hierarchical or distributed models. Link comprises any medium over which two nodes communicate information with each other. Exemplary links include but are not limited to wired, fiber, cable, or wireless links. Communication channel comprises any channel used with a link for delivery of learning or instructional material content, or environments to a student.

A learning environment comprises any environment created using instructional material or content, including learning workspaces, shared whiteboards, reference tools, such as a dictionary, encyclopedia, thesaurus, calculator, games, etc. Instructional material means any material of instructional value used for instructing a student or for assessing a student's skills. Examples of instructional material are any one of work sheets, practice sheets, problem sets as well instructional audio, video, text, image, lectures, briefs, papers, software, environment, simulation, interface, content, presentations, documents, media files, test material, etc. Electronic instructional material comprises any instructional material that is delivered over a network. Exemplary electronic instructional materials comprise any instructional material delivered via electronic student or teacher work books.

A Learning environment can be created within a learning session or a classroom. A learning session comprises any session during which instructional material is delivered to one or more students. Online learning session means any learning session that takes place over a network. In-center learning session means any learning session that takes place at a learning center. A classroom comprises any environment that allows for interaction amongst a plurality of students with or without a teacher. Non-virtual classroom comprises any physical or real life classroom. Exemplary non-virtual classrooms comprise any brick and mortar classrooms.

A virtual classroom comprises any computer simulated classroom created over a network. Exemplary virtual classrooms comprise text, audio or video or media chat rooms where students interact with each other over a network with or without teacher involvement.

Learning sessions may be associated with one or more educational programs. An educational program comprises any program that requires attendance of a student in one or more learning sessions. Examples of educational programs include math, reading, algebra, homework help, test preparation, tutoring, etc. An educational program may comprise an in-center educational program requiring in-center learning sessions, an online educational program requiring online learning sessions, or a hybrid educational program that includes both in-center and online learning sessions.

Enrollment means any process where enrollment information associated with a student (e.g., student name, grade level and/or demographic information) is entered into a database to create a student account for attending one or more learning sessions. Enrollment may take place in-center or online. In-center Enrollment refers to any enrollment of a student at a learning center. Online Enrollment refers to any enrollment of a student over a network. A student may enroll for an in-center educational program, an online educational program, or a hybrid educational program, using in-center Enrollment and/or online Enrollment. A responsible authority may or may not be associated with a student. A responsible authority associated with a student comprises any person, entity or authority that is responsible for a student account. Examples of responsible authorities are parents, guardians, public or private school officials, etc.

Referring now to FIG. 1, there is depicted a block diagram of a learning system 100 according to an exemplary embodiment of the present invention. According to this embodiment, a plurality of learning centers 104a, 104b, 104c are connected to an online learning portal 102 through a network, such as the Internet 120. Also connected to the online learning portal 102 via the Internet 120 are a plurality of user nodes 116 located in, for example, home 110a, office 110b, or an area of public access 110c. A user node can be a wireless node 108 used by an individual user 106 for connecting to the network. The users 106, 114 at the user nodes 108, 116 can be students, teachers, responsible authorities, learning center administrators, learning center staff, learning center directors, etc. Alternatively, the user may be a responsible authority for a student registered at one or more learning centers 104a-c. The user may also be a responsible authority for a very large group of students, for example, a school district director.

The online portal 102 provides a gateway between the user nodes 108, 116, the learning centers 104a-c, and the online learning system 130 through the network 120. The online learning system 130 provides learning environments during which teachers and students can hold online learning sessions. In one exemplary embodiment, the online learning system 130 can be a stand alone system that can provide online learning sessions to a plurality of students. In another exemplary embodiment, the online learning system 130 is coupled to a plurality of learning centers 104a-c through the online learning portal 102 and provides online learning sessions to students associated with the learning centers 104a-c.

Learning centers may be of different types and be identified as such. Some can be categorized according to their relationship with the online learning system 130. For example, some learning centers may be owned by franchisees of the entity that owns and operate the online learning system 130 (i.e. franchisee learning centers), whereas other learning center(s) may be owned by an independent entity (i.e. corporate learning centers, third-parties, affiliates, non-profit organizations, etc). In one embodiment, a different billing and scheduling utility is provided based on learning center types. To identify the learning center as corporate or franchisee, a center identification number that is associated with the learning center designates the learning center, for example, as a corporate or a franchisee learning center.

The learning system 130 supports and includes all of the features disclosed in U.S. Pat. No. 6,592,379 titled "METHOD FOR DISPLAYING INSTRUCTIONAL MATERIAL DURING A LEARNING SESSION," U.S. Pat. No. 6,729,885 titled "LEARNING SYSTEM AND METHOD FOR ENGAGING IN CONCURRENT INTERACTIVE AND NON-INTERACTIVE LEARNING SESSIONS," U.S. Pat. No. 6,733,296 titled "LEARNING SYSTEM AND METHOD FOR HOLDING INCENTIVE-BASED LEARNING," U.S. Pat. No. 6,804,489 titled "LEARNING SYSTEM AND METHOD FOR TEACHER LOAD BALANCING," U.S. Pat. No. 6,804,489 titled "LEARNING SYSTEM AND METHOD FOR TEACHER LOAD BALANCING," and U.S. Pat. No. 6,733,295 titled "LEARNING SYSTEM FOR ENABLING SEPARATE TEACHER-STUDENT INTERACTION OVER SELECTED INTERACTIVE CHANNELS," all of which are hereby incorporated by reference in their entirety.

As described later in more detail, the online learning system 130 provides the necessary user interfaces for the students and teachers to communicate with one another, for example, allowing the teacher to interact with and monitor student activities. The online learning system 130 also includes one or more databases containing electronic instructional material delivered to students during online learning sessions. The online learning system also includes one or more databases containing session disposition, demographics, outcomes, learning plans, assessments, progress tracking, etc.

The online portal 102 provides an interface between the users, e.g. teachers, students, and responsible authorities, and the online learning system 130. The online portal 102 also provides an interface for learning center directors to access the online learning system 130. The online portal 102 is provided with a portal database 140 which stores user information for all users enrolled or associated with an educational program. The online portal 102 provides means for users to log into the online learning system 130 with a user ID and password. Based on the access privilege associated with the user ID, the online learning portal 102 may authenticate the user as a teacher, a student, a responsible authority, a director, etc. The online learning portal 102 also tracks the student and teacher's scheduling, attendance, and billing. Finally, the online learning portal 102 synchronizes the student profile and other student information stored between the online learning system 130 and the learning center 104a-c where the student is enrolled.

In one exemplary embodiment, a student or teacher user is associated with one or more learning centers 104a-c. For example, the student user 114 may be enrolled at the learning center 104a and registered to attend in-center learning sessions for math, while another student user 106 may be enrolled at the learning center 104b and registered to attend in-center learning sessions in reading. Further, a student user may also be enrolled in educational programs at two or more learning centers 104a-c, attending corresponding in-center learning sessions at each learning center.

The teachers and students can also hold online learning sessions remotely from their mobile devices 108, homes 110a, offices 110b, or other public access areas 110c, without having to attend in-center learning sessions. Through these online learning sessions, a teacher can assign homework and instructional material to a student enrolled at a learning center, monitor the student's progress, grade the student, and interface with the student through interactive communication channels in real time or asynchronous modes.

A learning center 104a-c may prescribe an educational program (i.e. a prescription) for each student that is tailored to the student's specific educational needs. For example, the prescription may include certain skill gaps in the student's math, science, or reading ability and provide a learning program to the student that is aimed at realizing the student's grade level. An educational system and method implementing the foregoing is disclosed in U.S. Pat. No. 6,146,148 titled "AUTOMATED TESTING AND ELECTRONIC INSTRUCTIONAL DELIVERY AND STUDENT MANAGEMENT SYSTEM," which is hereby incorporated by reference in its entirety.

Hybrid Educational System and Method

According to one aspect of the present invention, a student enrolled at a learning center 104a-c can and/or an online educational program via the online learning system 130 can attend both online and in-center sessions. In the system of the present invention, a student can, via the online learning system, enroll in an online educational program that is not associated with a learning center and disenroll from the program upon its completion. A student can also enroll in one or more online educational programs that are offered in relation to, or in conjunction with learning centers, where a learning center 104a-c and the online learning system 130 can both contribute to one or more learning programs enrolled by the student, thereby creating a hybrid learning environment in which the student can benefit from both in-center and online learning sessions. In an exemplary embodiment, a student enrolled in one or more educational program (e.g. mathematics, reading, algebra, etc.) at a learning center 104a-c can also attend, if necessary or desired, online learning sessions offered by the online learning system 130.

According to this aspect of the present invention, a student enrollment node within the system enrolls students in one or more educational programs that deliver instructional material to the student at different instances of time. At a first instance of time, the instructional material is delivered to the student during an in-center learning session. At a second instance of time, the instructional material is delivered to the student during an online learning session. In an exemplary embodiment, a learning center delivers the instructional material (physically or electronically) during the in-center learning session, and an electronic instructional delivery node delivers electronic instructional material during the on line learning session. Instance of time can relate to any time or temporal parameter during an hour, day, week, month, year, etc. For example, the first instance of time can be one time of a weekday and second instance of time can be another time of the same or another weekday.

The student may enroll in an educational program on line, in-center, or both at any time. The student may also enroll at an in-center educational program at one time and enroll for the online educational program at a different time. Similarly, the student may enroll for an online educational program at one time and later complement the online educational program by enrolling at an in-center educational program and vice versa.

According to another embodiment of the invention, if the student enrolls for an online and an in-center educational programs, a determination is made as to whether the two educational programs can be combined. If the online educational program is related to the in-center educational program, the two programs are combined and/or correlated with each other to provide a hybrid learning environment in which the student can benefit from both in-center and online learning sessions. However, if the two programs are unrelated, then the two programs are not combined.

For example, if the student enrolls for online algebra and in-center trigonometry, the two educational programs are not combined because the subject matters are not related. Similarly, if the student enrolls for online basic reading and in-center advanced reading where the instructional material provided in the online reading program are different from the instructional material provided the in-center reading program, then the two reading programs are not combined. However, if the student enrolls in an online basic math program and an in-center basic math program, the two math programs can be combined into a hybrid math program, wherein the student can take an online math learning sessions at a first instant, and later continue where he left off during an in-center learning session at a second instant. The online learning system 130 and learning centers 104 a-c are provided with information for coordinating switching between online and in-center learning sessions.

The determination to combine the online educational program and the in-center education program can depend on a variety of factors and can take place in any suitably configured node. In an exemplary embodiment, the determination is based on the level of similarity of the curricula associated with the online and in-center educational programs and/or whether the two curricula are combinable. In another exemplary embodiment, the determination is based on whether the two programs offer identical or similar instructional material.

After any one or more of the enrollments described above, one or more student accounts are created in connection with enrolled educational programs. Lesson sequencing between the two modes are combined and updated through two-way communication between the in-center and online systems. A scheduling node associates each student account with one or more learning sessions selected based on student and teacher schedules. After scheduling, the student can attend in-center or online learning sessions at different times before or after each other and in any order for completing an educational program. The schedules for attending in-center and online learning sessions can be modified at any time to accommodate teacher and student availability.

In one exemplary embodiment, the educational program comprises a plurality of educational components, e.g., courses, subjects, lessons, Intended Learning Objectives (ILOs), skills, tests, etc. ILOs are objectives set at each grade level to determine what student needs to learn, for example, 5PS12 Solve word problems involving perimeter or 7MI/I Main Idea Implied. Under this arrangement, one instructional material is associated with a first educational component delivered during the in-center learning session and another instructional material is associated with a second educational component delivered during the online learning session. In this way, different educational components, e.g., subjects, can be delivered at different times either in-center or online in a hybrid manner.

For example, a learning center can deliver instructional material related to a first subject to the student during an in-center learning session and an instructional material delivery node can deliver instructional material related to a second subject during an online learning session either before or after the in-center session.

Under this aspect of the present invention, students attend an in-center learning session in the learning center 104a-c during one time period (e.g. Monday from 2-3 pm), and attend an online learning session during another time period (e.g. Tuesday from 6-7 pm). In one exemplary embodiment, the system and method of the present invention tracks the student's activity during the first time period, i.e., in-center learning session, so that the student may continue where he left off during the second time period, i.e., the online learning session. For example, if the student completes lesson 1 and half of lesson 2 of the math program during the in-center learning session at his learning center 104a-c, the student may take the following learning session online where he can continue with the second half of lesson 2.

Therefore, one aspect of the present allows for student attendance in online and in-center learning sessions conducted during different instances of time to be tailored to accommodate instant or planned instructional needs. This feature offers the students and responsible authorities the flexibility for adapting to various circumstances that may arise in the course of students completing one or more educational programs. For example, a student unable to attend an in-center learning session, for example, due to unforeseen or planned circumstances, such as emergency sickness or scheduled vacation, can still continue with the program by attending online sessions, remotely, e.g., from home or vacation.

Another embodiment allows for student to enroll in one educational program at a learning center and later enroll in the same educational program in the online learning system 130 after disenrolling from the learning center. Such enrolment and disenrollment of students between learning center programs and online programs can be based on student needs. One embodiment maps and synchronizes learning center and online individual learning objective (ILO) parameters, e.g., status, codes, etc., based on specified rules that track student activities between one or more learning centers and the online learning system while maintaining seamless online and in-center educational program delivery even when students transfer between online and in-center learning sessions. In another embodiment, a student can be enrolled in different educational programs online or in the learning centers. For example, a student can be enrolled in one educational program by registering to take online sessions. The same student can be enrolled in another educational program in a learning center by taking in-center learning sessions.

Figure 2A:
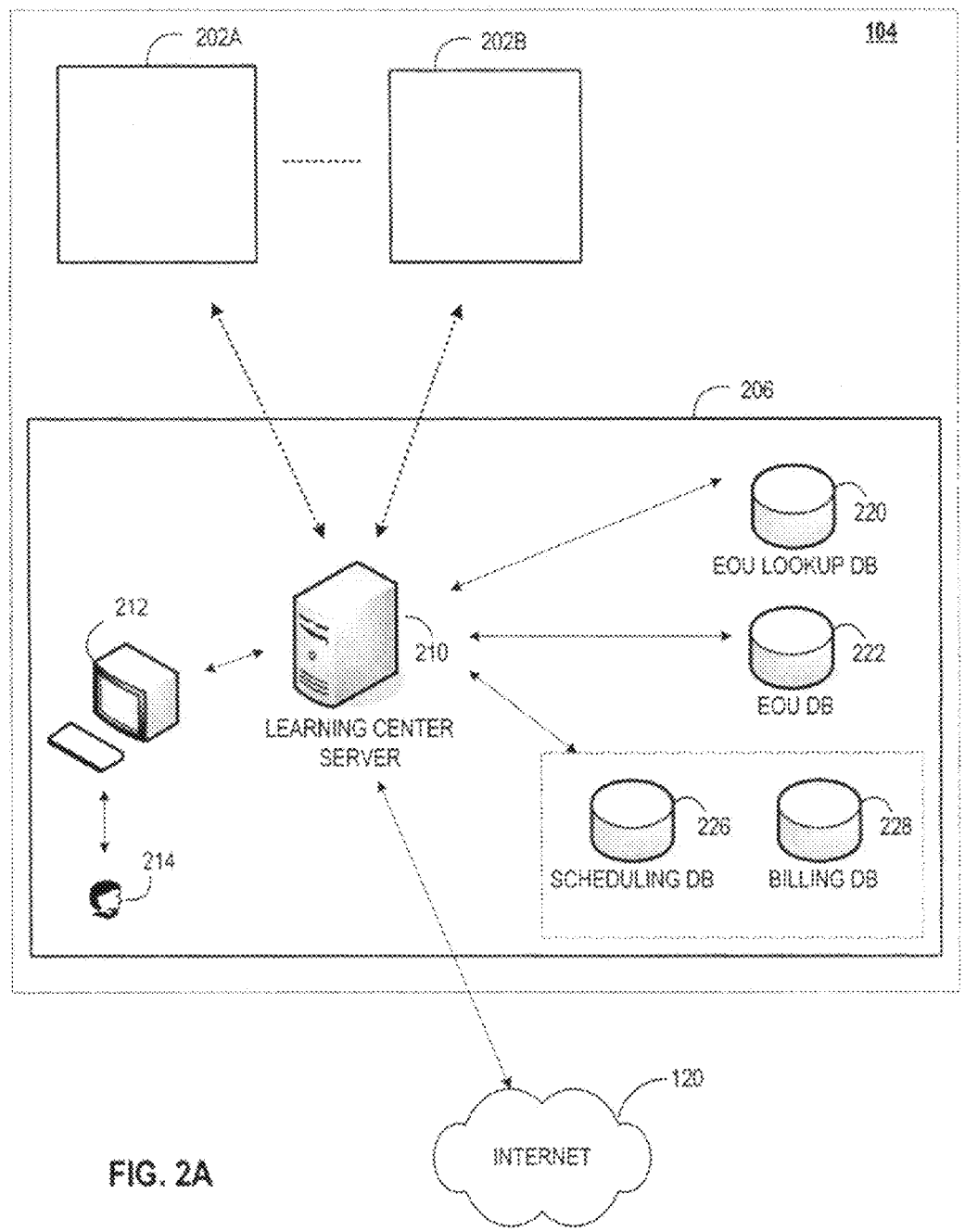
FIG. 2A shows an exemplary block diagram of a learning center including an administrative environment.

FIG. 2A depicts an exemplary block diagram of a learning center 104. The learning center 104 includes one or more classrooms 202a-b and an administrative environment 206. The administrative environment 206 includes a learning center server 210 providing connectivity to the Internet 120. The administrative environment 206 also includes a system administrator 214 who monitors and administers the local server 210 through a workstation 212.

The learning center server 210 has an educational operating utility (EOU) that provides the platform for creating in-center learning sessions as well as delivering instructional material to students during the in-center learning sessions. The learning center server 210 is coupled to an EOU Database 222 which stores students' information, including the student profiles, and the instructional material. During the in-center learning session, the EOU retrieves the student profile associates with a student from the EOU Database 222 and, based on the student profile, retrieves the appropriate instructional material from the EOU Database 222 to create an in-center learning session for the student. The learning center server 210 is also coupled to an EOU Lookup Database 220, which is used to store student information for audit and lookup purposes.

In one embodiment, the EOU tracks the students' activities and progress and update the student's profile accordingly. In an alternate embodiment, at the conclusion of an in-center learning session, the teacher or other center staff updates each student's profile based on the student's activities and progress during the in-center learning session. The student's profile is updated in the EOU database 222.

In addition to the EOU, the learning center server 210 is also provided with a billing utility and a scheduling utility. In an exemplary embodiment, the billing and scheduling utility stores a learning center schedule at the scheduling database 226 coupled to the learning center server 210. The billing and scheduling utility uses the learning center schedule to create the student schedule periodically, e.g., daily, weekly, monthly, etc. basis. The billing and scheduling utility does so by matching the student's schedule with a teachers' schedule, which is also stored in the scheduling database 226. In one embodiment, the billing and scheduling utility is associated with a matching utility to create the student schedule, the details of which are explained in detail later.

In an exemplary embodiment, the billing and scheduling utility is also responsible for tracking the students' attendance. For in-center learning sessions, the teacher or other center staff may input data relating to students' attendance after the conclusion of the learning session. The student attendance record is stored in the scheduling database 226 or the billing database 228, which is also coupled to the learning center 210.

As described later, a billing and scheduling utility monitors detect and tracks the student's attendance in online sessions based on a set of predefined rules, which include, e.g., the time of student's login and logout, number of lessons scored, academic and technical session feedback, etc. In an exemplary embodiment, a set of billing rules relating to billing the students is stored at the billing database 228. Such rules define the circumstances under which a learning session can be billed. The billing and scheduling uses the student's schedule, the attendance records, and the billing rules to recommend a bill for the student.

Figure 2B:
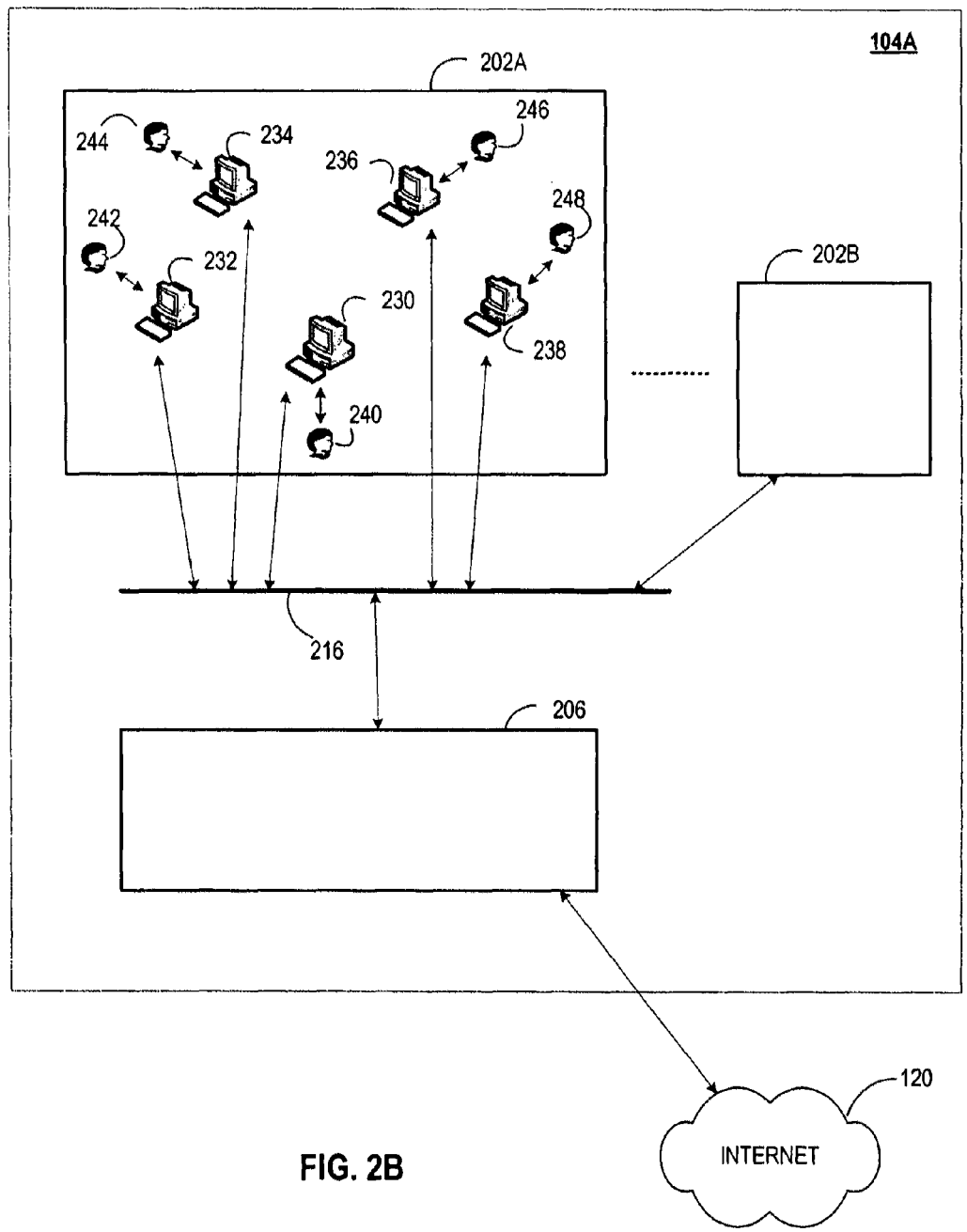
FIGS. 2B-C show exemplary block diagrams of a learning center having non-virtual classrooms.
Figure 2C:
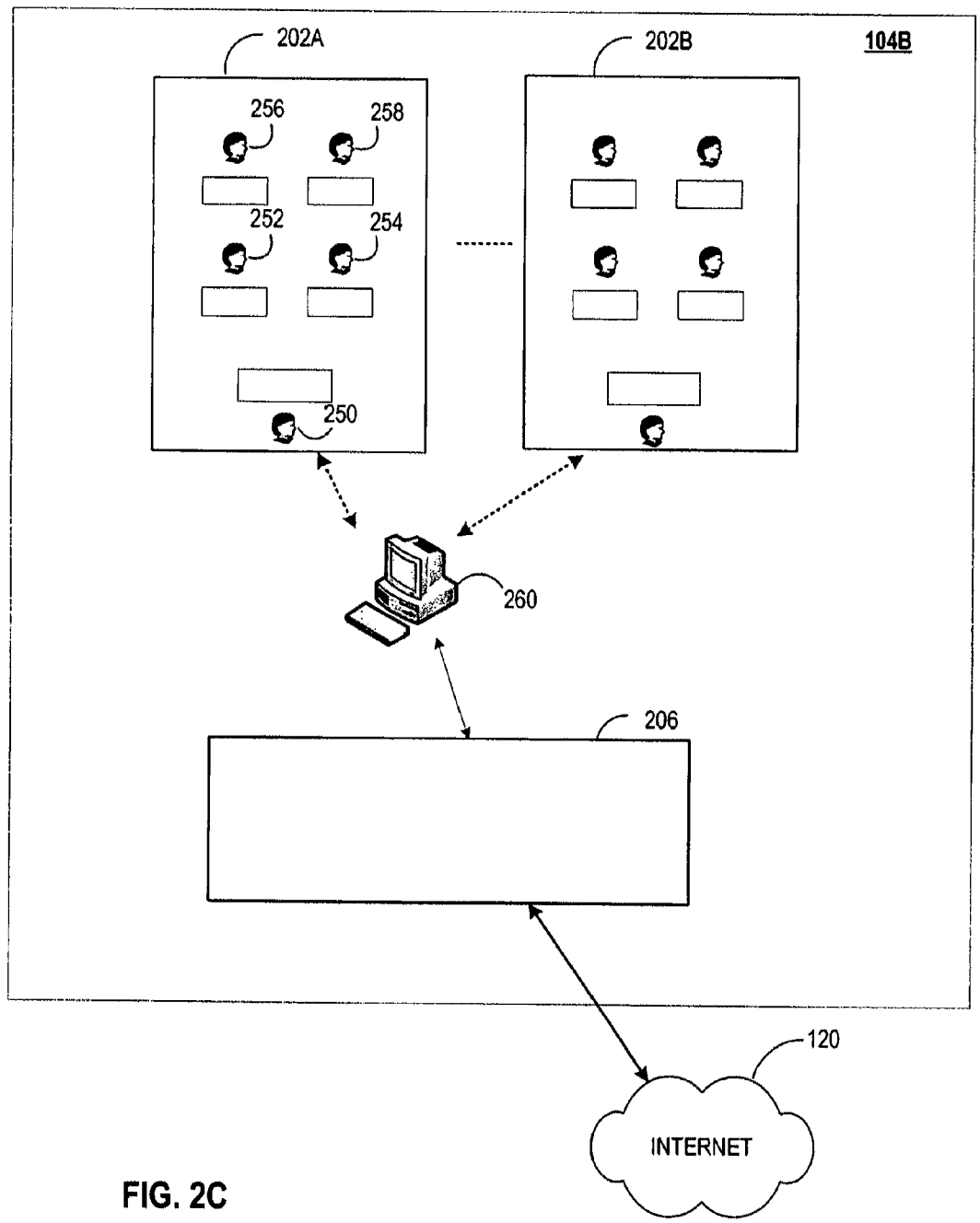

FIGS. 2B-C depict exemplary block diagrams of various types of learning centers 104a-c. Specifically, FIG. 2B shows an exemplary block diagram of a learning center 104a including a plurality of non-virtual classrooms 202a, 202b, such as conventional brick and mortar classrooms. The non-virtual classrooms 202a-b are connected to the administrative environment 206 (specifically, the learning center server 210 within the administrative environment 206) via a local area network 216. Inside each non-virtual classroom 202a-b, there are a teacher workstation 230 and a plurality of student workstations 232-238, which allow the teacher 240 and students 242-248 to hold in-center learning sessions at the non-virtual classrooms. In one embodiment, the teacher workstation 240 and student workstations 242-248 are equipped with a pen-based tablet input and a display. The teacher workstation 240 communicates with the student workstations 242-248 through the network 216. Through the LAN 216 (or any WAN, or Internet), the teacher 240 conducts the learning session by holding guided practice (GP) sessions as well as independent practice (IP) sessions. The teacher 240 also delivers instructional material (e.g., electronic workbooks) to the student workstations 232-238 through the network 216. After the delivery of the electronic instructional material, the teacher 240 can also monitor each student's progress, grade the student's homework, and interact with the student through the network 216. Meanwhile, the teacher can deliver physical instructional material to the students, answer students' questions, and interact with the students face-to-face during the in-center learning session. Therefore, during the in-center learning session, the students 242-248 benefit from having face-to-face interaction with each other and the teacher 240 as in traditional classroom environments, while being presented with electronic instructional material.

In another embodiment of the invention, all electronic instructional material may be stored in a remote database accessible by a remote server (not shown in FIG. 2A). In this embodiment, all workstations 230-238 connect to the Internet 120 to access the electronic instructional material from the remote server. The electronic instructional material may be provided to the students 242-248 through, for example, java applets embodying electronic student workbooks.

FIG. 2C shows an exemplary block diagram of a learning center 104B including traditional non-virtual classrooms 202a-b. The classroom 202a-b includes a teacher 250 teaching students 252-258 using physical instructional material. Physical instructional materials include conventional textbooks and any audio-visual instructional material used to teach the students. In a non-virtual classroom 202a-b, the students 252-258 could write notes or take exams using pen and paper within an in-center learning session. At the conclusion of the in-center learning sessions, or within a certain time thereafter, the teacher 250 or another learning center staff can report each student's progress on a computer 260. The computer 260 is connected to server 210 in the administrative environment 206. Using the computer 260, the teacher 250 or center staff can update the student's profile, attendance record, etc. Thus, the student's progress status is known to the system the next time the student attends a learning session. Based on the known progress status, the system allows for switching between In-class or online sessions based on student needs.

Figure 2D:
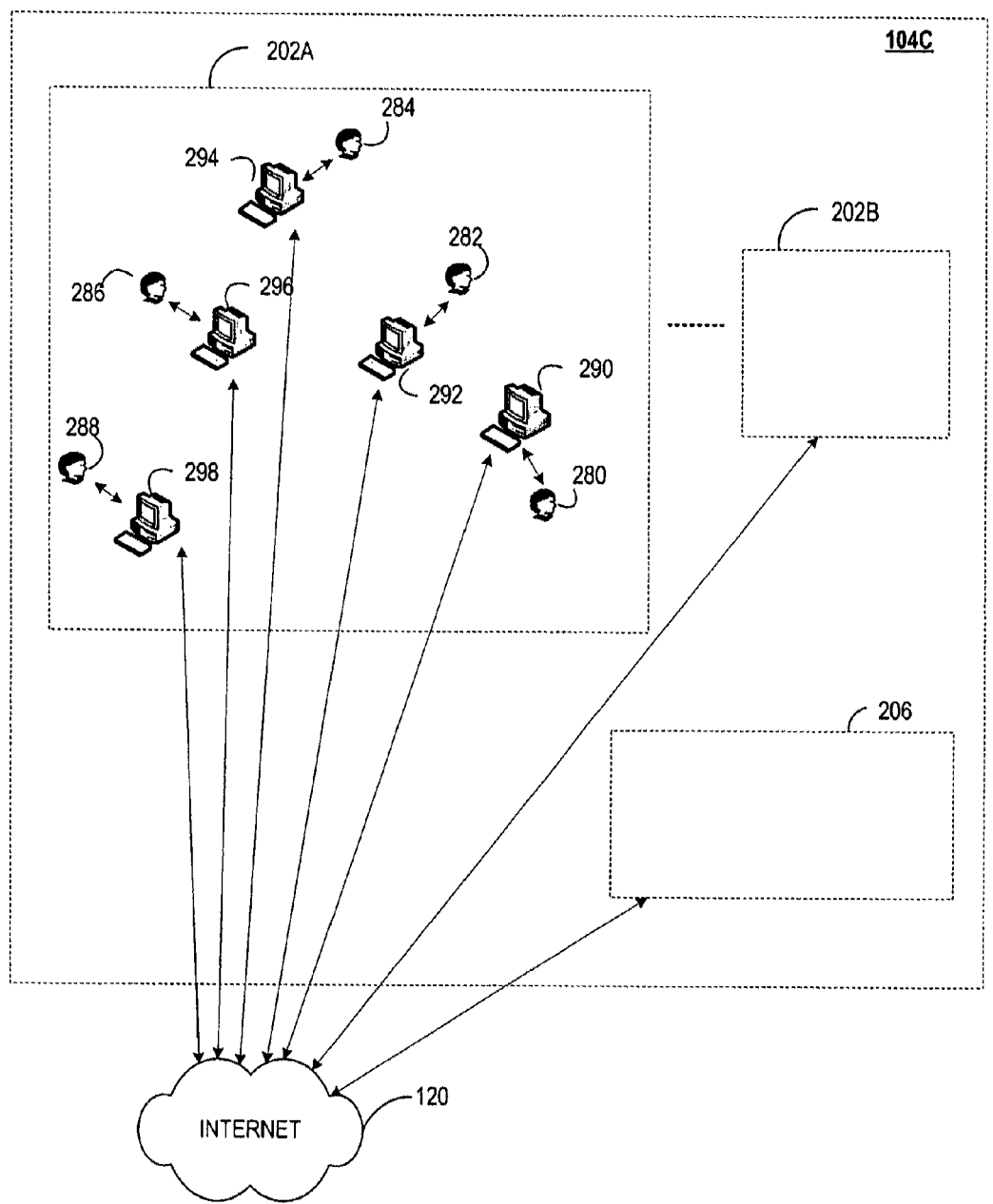
FIG. 2D shows an exemplary block diagram of a virtual learning center.

FIG. 2D depicts an exemplary block diagram of a virtual learning center 104C, in which a plurality of virtual classrooms 202a-b are provided. Within each virtual classroom 202a-b, there are a plurality of students 282-288 and one or more teachers 280, who hold learning sessions using workstations 290-298 connected to the Internet 120. According to an embodiment, the virtual learning center 104C also includes an administrative environment 206, which, as in the administrative environments of non-virtual learning centers, includes a learning center server 210, EOU database 222, billing database 228, scheduling database 226, etc. The administrative environment 206 may also include a system administrator 214. In one embodiment, the administrative environment 206 tracks each student's activity and updates the student's profile accordingly. The teacher 280 or other center staff may also update or modify the students' profiles after the conclusion of a virtual learning session.

In a virtual learning center 104C, in addition to taking online classes, a student may also be provided with online exams, e.g. a pre-enrollment assessment test. Additionally, the student may enroll for a program online without a face-to-face meeting with the learning center staff, while the staff create a student profile for the student based on the student's assessment test results and provide the student with a schedule. Therefore, a student who cannot attend a nearby learning center due to geographic restrictions can enroll at the virtual learning center 104C and benefit from the programs similar to those provided by other learning centers 104A-B.

Figure 3:
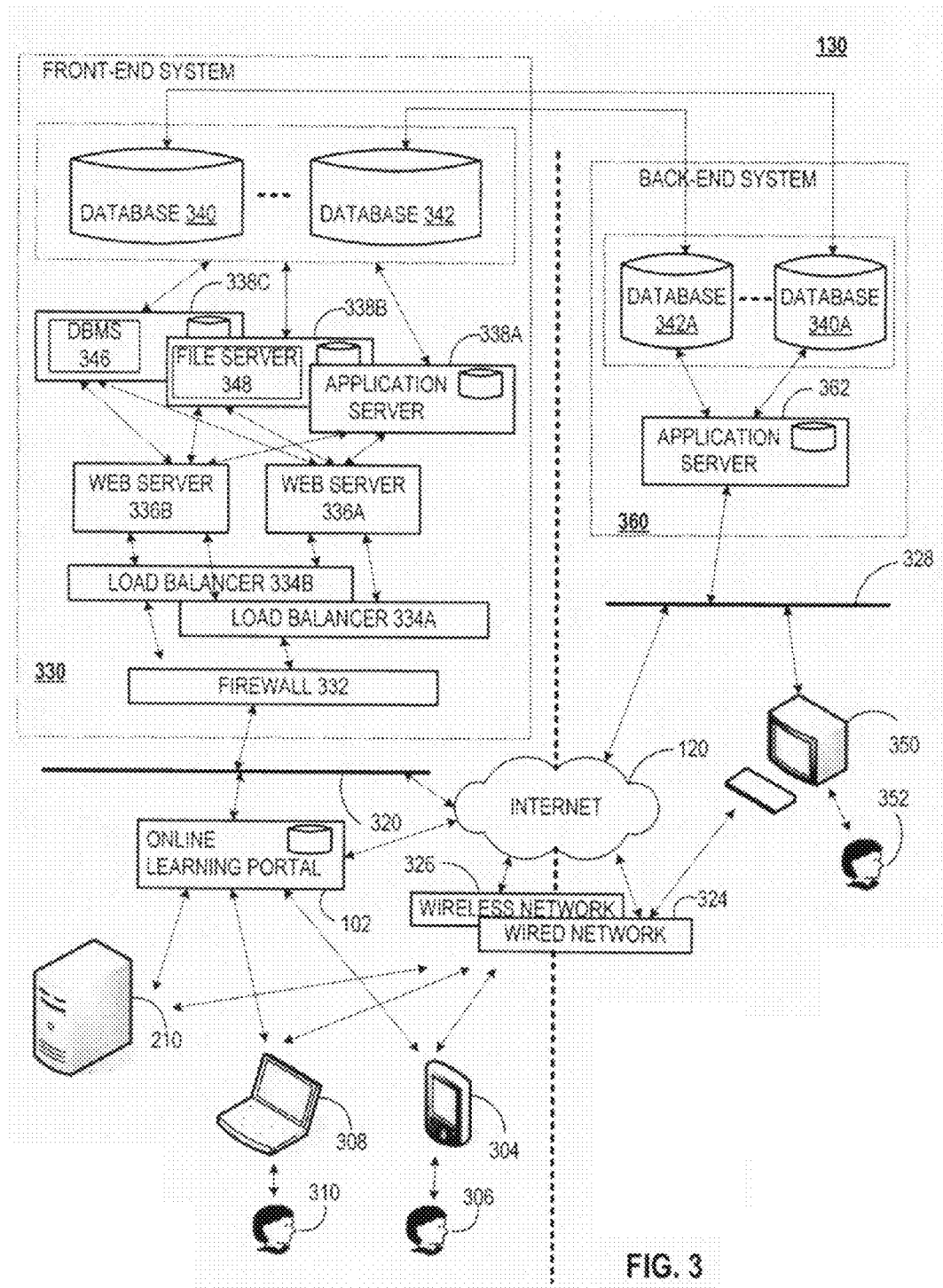
FIG. 3 shows an exemplary block diagram of an online learning system.

FIG. 3 shows an exemplary block diagram of the online learning system 130 according to an exemplary embodiment of the present invention. Some of the functions of the online learning system 130 include establishing online learning sessions, development and delivery of electronic instructional material and content as well as creation of virtual learning environments for students. According to this embodiment, the online learning system 130 includes a front-end system 330 and a back-end system 360. The front-end system 330 provides user interfaces to students, teachers, or other users, for access to online learning sessions. The back-end system 360 is used for system administration, instructional material and content development and implementation as well as application developments for billing, marketing, public relations, etc.

The front-end system 330 interfaces with the user devices 304, 308, allowing users 306, 310 to interface with virtual learning environments. Users 306, 310 include teachers, students, responsible authorities, directors, etc. The front-end system 330 provides users 306, 310 interactive access to online sessions. The user devices 304, 308, and/or a plurality of learning center servers 210 are coupled to the online learning portal 102 via a network 320, which may be a LAN, WAN, or other local network. The online learning portal 102 acts as a gateway between the front-end system 330, the user devices 304, 308, and a plurality of learning centers via corresponding learning center servers 210. Alternatively, the user devices 304, 308, and/or learning center servers 210 may be coupled to the online learning portal 102 via the Internet 120 or through a wired network 324 and/or a wireless network 326.

In an exemplary embodiment, the user devices 304, 308 execute a network access application, such as a browser or any other suitable application or applet, for accessing the front-end system 330. The users 306, 310 may be required to go through a log-in session before engaging in an online learning session through the website. Other arrangements that do not require a log-in session may also be provided in accordance with other exemplary embodiments of the invention.

In the exemplary embodiment shown in FIG. 3, the front-end system 330 includes a firewall 332, which is coupled to one or more load balancers 336a, 336b. Load balancers 336a-b are in turn coupled to one or more web servers 336a-b. For providing online learning sessions, web servers 336a-b are coupled to one or more application servers 338a-c, each of which includes and/or accesses one or more front-end databases 340, 342, which may be central or distributed databases. Web servers 336a-b, coupled with load balancers 334a-b, perform load balancing functions for providing optimum online session performance by transferring client user requests to one or more of the application servers 338a-c according to a series of semantics and/or rules. The application servers 338a-c may include a database management system (DBMS) 346 and/or a file server 348, which manage access to one or more databases 340, 342. In the exemplary embodiment depicted in FIG. 3, the application server 338a and/or 338b provides instructional content to the users 306, 308, which include electronic interfaces, instructional material, student profile, etc. Some of the instructional content is generated via code stored either on the application servers 338a and/or 338b, while some other information and content, such as student profiles, instructional material, teacher schedule, or other information, which is presented dynamically to the user, is retrieved along with the necessary data from the databases 340, 342 via application server 338c. The application server 338b may also provide users 302, 306 access to executable files which can be downloaded and installed on user devices 304, 308 for creating an appropriate virtual learning environments, with branding and or marketing features that are tailored for a particular application, client or customer.

The central or distributed database 340, 342, stores, among other things, the web content and instructional material deliverable to the students. The database 340, 342 also stores retrievable information relating to or associated with students, teachers, responsible authorities, parents learning centers, student profiles, billing information, schedules, statistical data, attendance data, enrollment data, teacher attributes, student attributes, historical data, demographic data, compliance data, certification data, billing rules, third party contract rules, educational district requirements, etc. Any or all of the foregoing data can be processed and associated as necessary for achieving a desired learning objective or a business objective associated with operating the system of the present invention. For example, historical or statistical data related to student attendance or schedule and/or teacher availability and schedule may be associated and/or processed for teacher utilization and capacity planning as well as teacher workflow management. One exemplary process takes into account historical cancellation and addition rates for all student cohorts for teacher capacity and workflow management. On exemplary aspect of the invention uses the foregoing data processing to determine how many teachers are needed and provides the mechanism to increase or decrease according to demand. By performing the capacity planning, the system arranges for scheduling more teachers during specific times ahead where teacher shortages are expected or "pulling" teacher schedules where teacher overages are expected.

Updated program code and data are transferred from the back-end system 360 to the front-end system 330 to synchronize data between databases 340, 342 of the front-end system and databases 340a, 342a of the back-end system. Further, web servers 336a, 336b, which may be coupled to application servers 338a-c, may also be updated periodically via the same process. The back-end system 360 interfaces with a user device 350 such as a workstation, enabling interactive access for a system user 352, who may be, for example, a developer or a system administrator. The workstation 350 is coupled to the back-end system 360 via a local network 328. Alternatively, the workstation 350 may be coupled to the back-end system 360 via the Internet 120 through the wired network 324 and/or the wireless network 326.

The back-end system 360 includes an application server 362, which may also include a file server or a database management system (DBMS). The application server 362 allows a user 352 to develop or modify application code or update other data, e.g., electronic content and electronic instructional material, in databases 340a, 342a.

Figure 4:
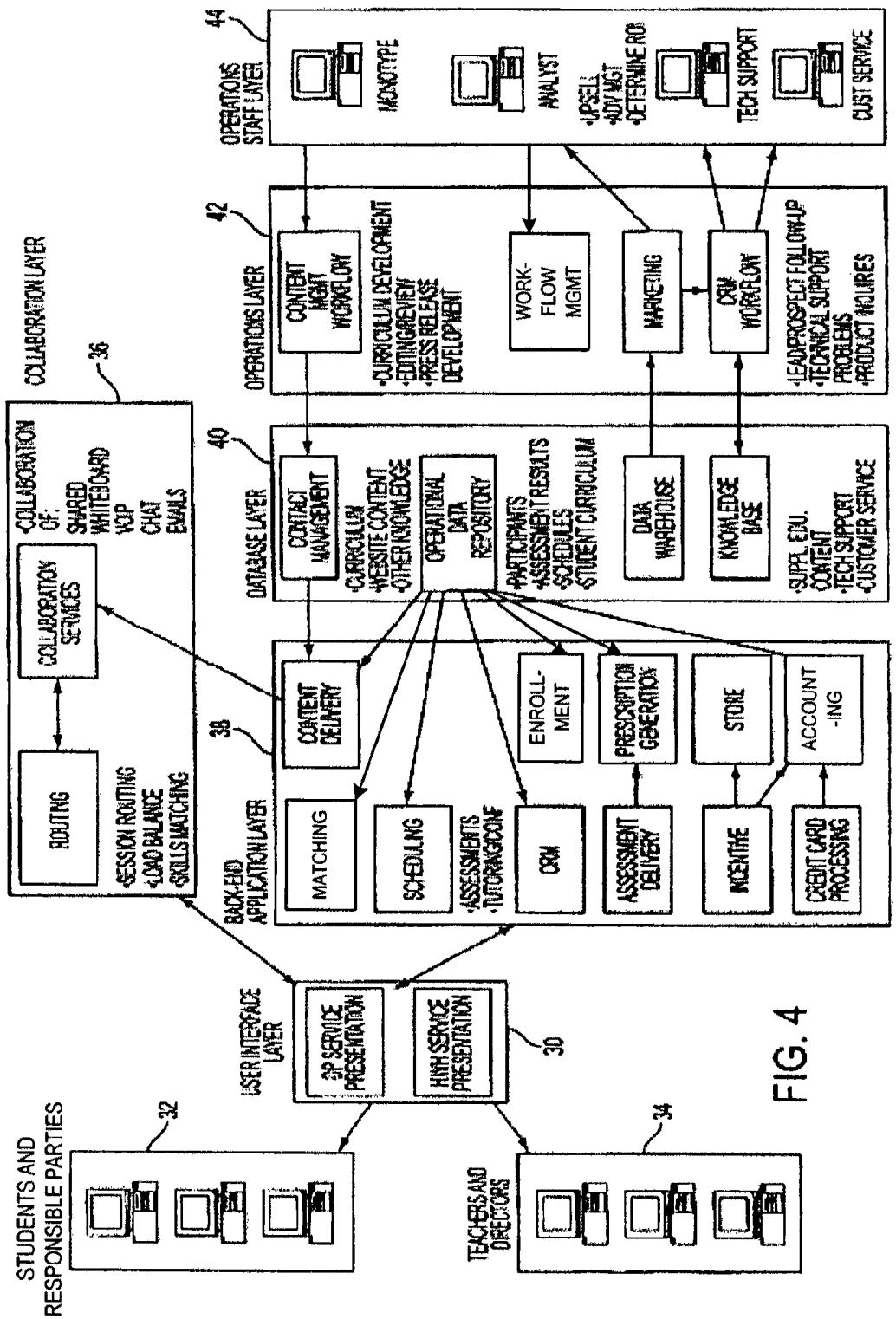
FIG. 4 shows an exemplary block diagram of operation layers of the online learning system of FIG. 3.

Referring to FIG. 4, a block diagram of operation layers of the online learning system 130 is shown. As stated above, the online learning system 130 can be a stand alone system implementing various inventive aspects of the present invention. The online learning system shown in FIG. 4 includes student and responsible authority workstations 32 as well as teacher and director workstations 34. Each work station can be a node connected to the online learning system 130 from any location. The workstations 32 and 34 execute suitable application programs, e.g., browser, etc., for engaging in instructional activities during learning sessions. The learning application program running on a student workstation 32 enables a student to interact with a teacher during a non-interactive or an interactive learning session, and the learning application program running on the teacher workstation 34 allows a teacher to engage plural students in multiple learning sessions.

Various application program layers for supporting the online learning system 130 include a user interface layer 30, collaboration layer 36, a back-end application layer 38, a database layer 40, an operations layer 42 and an operation staff layer 44. Each layer or any of its components can run on any suitably configured node, including servers or workstations, anywhere in the system in a central or a distributed manner.

The user interface layer 30 is responsible for interfacing with teachers, students, parents, responsible authorities, staff, etc. The user interface layer 30 receives input from multiple student workstations and multiple teacher workstations or any other node associated with a system. The workstations 32 and 34 are equipped with keyboards, mouse, pen-based tablets, audio headsets, speakers, cameras. In this way, the user interface layer 30 can communicate texts, image, video and audio information with the nodes. In one embodiment, teachers and students can attend learning sessions from any node as long as their respective access rights are verified via log-in processes. For example, when a teacher logs in, the system provides the necessary teacher rights and privileges for instructing a student. In another embodiment implemented over a private or trusted network, log-in may not be necessary.

In one exemplary embodiment, the user interface layer 30 also interfaces with an assessment center in a learning center or online. The assessment center can be used for diagnostic-assessment test and prescription for achieving one or more learning objectives, as described later in detail.

With or without an assessment-diagnostic test, as necessary, a student may enroll in an educational program offered through the online learning system 130. An enrollment node in the back end application layer 38 associates student enrollment information with corresponding student records. In one embodiment, for those students that take assessment tests, student records also include student profiles generated at the assessment center. The back-end application layer 38 also manages content delivery, teacher student matching, session scheduling and billing functions as well as customer relationship management (CRM) and credit card processing. A student incentive processing node supports incentive-based learning for improvement, participation and effort during learning sessions as well as links to third party vendor sites for redeeming issued reward tokens.

The collaboration layer 36 provides collaboration amongst the system users, e.g., teachers and students, during learning sessions. The collaboration layers 36 provides shared whiteboards and chat functions that may be required in learning sessions. As stated above, the collaboration layer 36 is responsible for routing and collaborating services. The collaboration layer 36 allows utilization of Voice Over Internet Protocols (VOIP) standards in maintaining interactive channels for transmitting audio and video information. An interactive channel formed over links is used for holding an interactive session between a teacher and one or more students. The interactive session allows the teacher and students to interact with each other through workbooks and a shared whiteboard during a learning session. A shared whiteboard is a shared display space reserved by the system for conducting interactive learning activities using various tools such as interactive highlighters, drawing and graphical tools, and etc. The collaboration layer 36 also supports chat, e-mail, and other Internet features.

The database layer 40 manages information storage functions related to user and learning content environments, information and data, including curriculum, web-site (internet/intranet) content, and other knowledge base information. The database layer 40 can also be a repository for operational data including the participants, schedules, assessment results, and student curriculum. Data warehousing functions and statistical analysis of attendance data as well as assessment and learning data and student data are also performed by the database layer 40. The database layer 40 also manages the knowledge base comprising, electronic instructional material, supplemental educational content, technical support, and customer service information.

The back-end layer 38 tracks various activities and inputs of each student and records student input data, either automatically through the student workstations 32, or manually as results of teacher inputs from a teacher workstation 34. The back-end application layer 38 is also responsible for delivering instructional materials to the user interface layer 30. The back-end application layer 38 also tracks deliveries of instructional materials to student workstations for charge calculation and billing purposes. The back-end application layer 38 also performs credit card processing and billing functions, for example, on a session by session basis, time or other criteria, as further described below.

Once enrolled, the student is scheduled to attend one or more learning sessions. The scheduled learning sessions may or may not be based on a prescription generated in accordance the student profile. For example, a student participating in a home work help program may schedule a learning sessions without prescription. A scheduling node (located anywhere in the system) tracks and manages student scheduling. A teacher student matching node runs a matching algorithm for matching students and teachers at the point of delivery of the learning sessions.

The operations layer 42 provides content management workflow, including the curriculum development, editing and reviewing the development information. The operation layer 42 also manages marketing and CRM (customer relationship management) workflow. This layer also provides for lead/prospect follow-up functions, technical support problems, and product inquiries. The operation layer 42 interfaces with operational staff layer 44 that comprises personal tech support, customer service and analyst information. The operation layer also provides for routing of information over the network for sessions and load balancing of the teacher's as well as skills matching.

In-Center and Online Enrollment

As stated before, a student may enroll in an educational program at a learning center or online with or without taking an assessment test. Enrollment may be related to attending learning session in an in-center educational program, online educational program or by an educational program. An enrollment may or may not involve a pre-enrollment conference with the student and/or a responsible authority. The following describes the various systems, utilities or components and process that enroll students in the system of the present invention.

In one embodiment of the invention, before a student can participate in an educational program, the student is enrolled at a learning center using an in-center learning process. According to an embodiment of the invention, the student may take an assessment test prior to enrollment at the educational program. An assessment of student skills may be conducted in an assessment center. An assessment center can comprise any environment, virtual or non-virtual, that assesses a student's skills to create student profiles containing one or more learning objectives. In one embodiment, each student takes a battery of online tests at a virtual assessment center using a student workstation. The assessment tests are generally designed to identify student abilities to perform different tasks or a mastery of certain learning objectives or skills. After the student takes the assessment, an educational program involving one or more learning objectives is created. Such learning objectives become part of the student's profile. The assessment test may be a standardized test evaluating a student's academic skills within a particular area. Exemplary assessment tests are the California Achievement Test, Fifth Edition (CAT/5) and the Northwest Educational Association (NEWA) Measure of Academic Progress (MAP) test. Non-standardized tests may also be provided for assessment of students' skills. Such tests could be more focused on the particularities of the available learning programs.

In one embodiment of the invention, the assessment test is used to determine a set of skill gaps for the student. For example, the assessment test can assess a sixth grade student's reading skills to be at a fourth-grade level and the student's math skills to be at a fifth-grade level. Based on the assessment test results, the student is prescribed a learning program tailored to the student's needs and skill gaps in order to assist the student to meet or surpass the skill level of his or her grade.

In one exemplary embodiment of the invention, the assessment test is conducted in a non-virtual classroom at a learning center using physical instructional material or electronic instructional material. In another exemplary embodiment, the assessment test is conducted using electronic instructional material. Thus, the assessment test may be administered with traditional paper-and-pencil exam and later scored manually or using a computer. The results of the assessment test are then stored in a database within the learning center. In an alternative exemplary embodiment, where the student is associated with a virtual learning center, the student takes an online assessment test. The completed test is then submitted to a teacher, staff, or director associated with the virtual learning center, who grades the test and store the test results into a database associated with the virtual learning center. The online assessment test administered online or in a non-virtual classroom may be provided in a form that can be automatically graded by the learning center server and stored at the learning center database.

After the assessment test is graded and stored, a student profile is created in the learning center database identifying the student's skill gaps. In one exemplary embodiment, the student profile includes a prescription for the student with one or more learning objectives tailored at assisting the student achieve such goals. The details of generating student profiles and delivery of instructional material based thereon are disclosed in U.S. Pat. No. 6,149,148.

In an embodiment of the invention, after the completion of the in-center enrollment, an online enrollment takes place to enroll the student at one or more online educational programs offered by the online learning system 130. In one embodiment, a pre-enrollment conference is conducted with the student and the associated responsible authority. The pre-enrollment conference may be conducted at a learning center or virtually online over the network. During the enrollment conference, the student selects one or more online educational programs to enroll. In one embodiment, the student can also specify a preferred schedule, wherein the student selects "preferred timeslots" to be scheduled for an online educational program. For example, the student can select "Tuesday and Wednesday from 2-3 pm" for online math and "Monday and Thursdays from 4-5 pm" for online reading as the preferred schedule. In a further embodiment, the student can also designate a "teacher preference", which can include a list of teachers that the student wishes to be associated with and/or a list of teachers that the student wishes to avoid. In one embodiment, all the information relating to student preferences is stored in the EOU database 222 and/or lookup database 220.

After the pre-enrollment conference, the student is enrolled for one or more online educational programs using an enrollment utility. The enrollment utility is an application executed on the learning center server 210 or any node. The enrollment utility uses the student's data, including the student's profile and prescription, the student's demographics, the assessment results, the student's billing and scheduling information, etc. to enroll the student at one or more online educational programs of the online learning system 130. Alternatively, the enrollment utility may be a web-based application that allows an enrollment administrator to upload the student's information to the online learning system 130.

Figure 5:
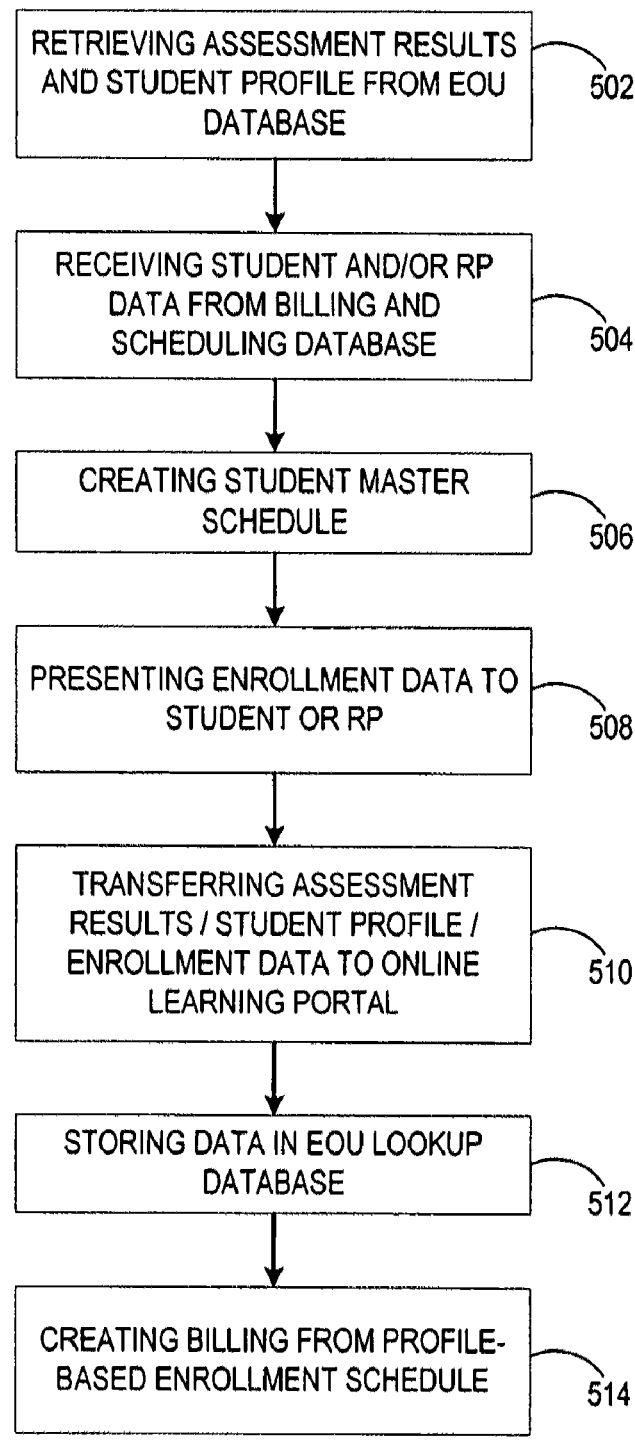
FIG. 5 shows an exemplary flow chart of an enrollment utility process for enrolling a student in an online educational program.

FIG. 5 depicts an exemplary flow diagram of the process taken by the enrollment utility to enroll a student at an online educational program. The enrollment utility retrieves assessment results and student profile from a database, block 502. The enrollment utility also retrieves student and/or responsible authority data from a billing and/or scheduling database, block 504. This information includes the student's availability, preferred schedule, and teacher preference.

Based on the student's preferred schedule, the enrollment utility creates a master schedule for the student, block 506. In one embodiment, the enrollment utility also looks up teacher availability and statistical data relating to learning sessions from the online learning portal 102 and uses that information in creating the student's master schedule. Using this arrangement, the enrollment utility can, for example, avoid scheduling the student within timeslots that have a high student/teacher ratio. Also, if the student has designated a teacher preference, the enrollment utility can use that information to match the student's schedule with the preferred teacher's availability.

Once the student master schedule is created, the enrollment utility presents the schedule, as well as other enrollment data, to the student and/or responsible authority, block 508. In one embodiment, the student and/or responsible authority are presented with a confirmation screen, where they can either confirm or modify the information. If the information is modified, the EOU database 222, and/or the billing and scheduling databases 226, 228, are updated accordingly.

After confirmation, the student's information, including the assessment results, student profile, and enrollment data, are transferred to the online learning portal 102, block 510. In an exemplary embodiment, the information is formatted as XML strings and delivered to the online learning portal 102 via http post. The XML string may be encrypted before delivery in order to provide further information security. The online learning portal 102 then decrypts and stores the data in the portal database 140. The online learning portal 102 also transmits the data to the online learning system 130.

In one embodiment, the enrollment utility stores the student data into the EOU lookup database 220, block 512. The EOU lookup database 220 can be used for future audit and/or lookup purposes. The enrollment utility also uses the student's master schedule to create billing transactions in the billing database 228, block 514. The billing transactions are later used, along with the student's attendance record, to create billing for student accounts.

Figure 6A:
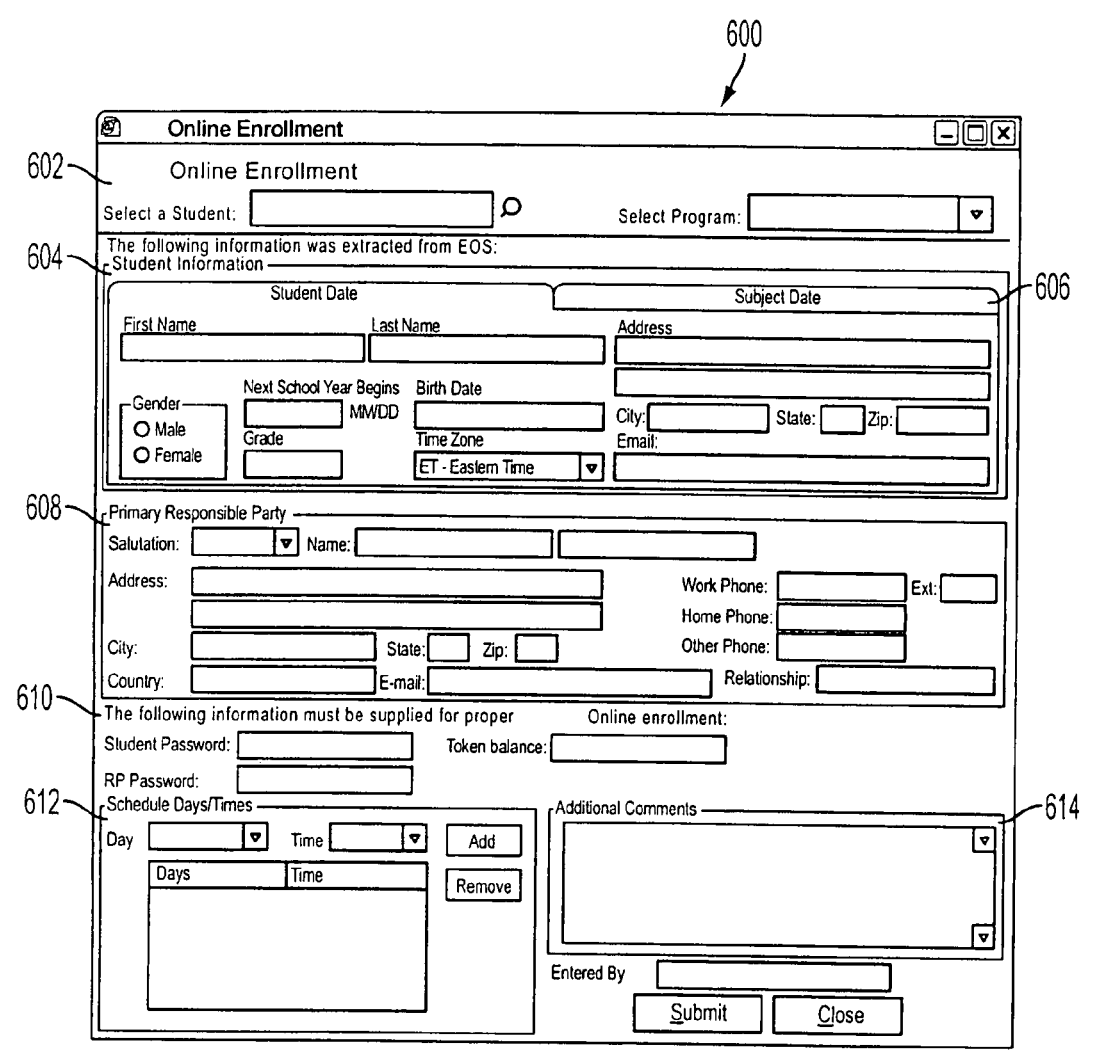

FIG. 6A shows an exemplary Enrollment screen 600 of the enrollment utility software according to an embodiment of the invention. In this embodiment, the enrollment screen 600 includes a student/program selection field 602, a student information field 604, a subject data information field 606, a responsible authority information field 608, a other information field 610, a scheduling field 612, and a comments field 614. An enrollment administrator may use the student/program selection field 602 to select a student for enrollment at an online educational program. Once a student is selected, the student's information is downloaded from the EOU database 222 and/or billing and scheduling databases 226, 228 and displayed in the student information field 604. The information relating to the student's responsible authority and other student information are also downloaded and displayed in the responsible authority information field 608 and other information field 610, respectively. Also, the student's master schedule, if any, is downloaded from the scheduling database 226 and displayed in the scheduling field 612. The enrollment administrator may modify the information within any of the above fields. Once the information is submitted from the enrollment utility screen 600, an enrollment request is submitted to the online learning system 130 for processing. FIG. 6a has a tab for selecting student data and subject data field.

Figure 6B:
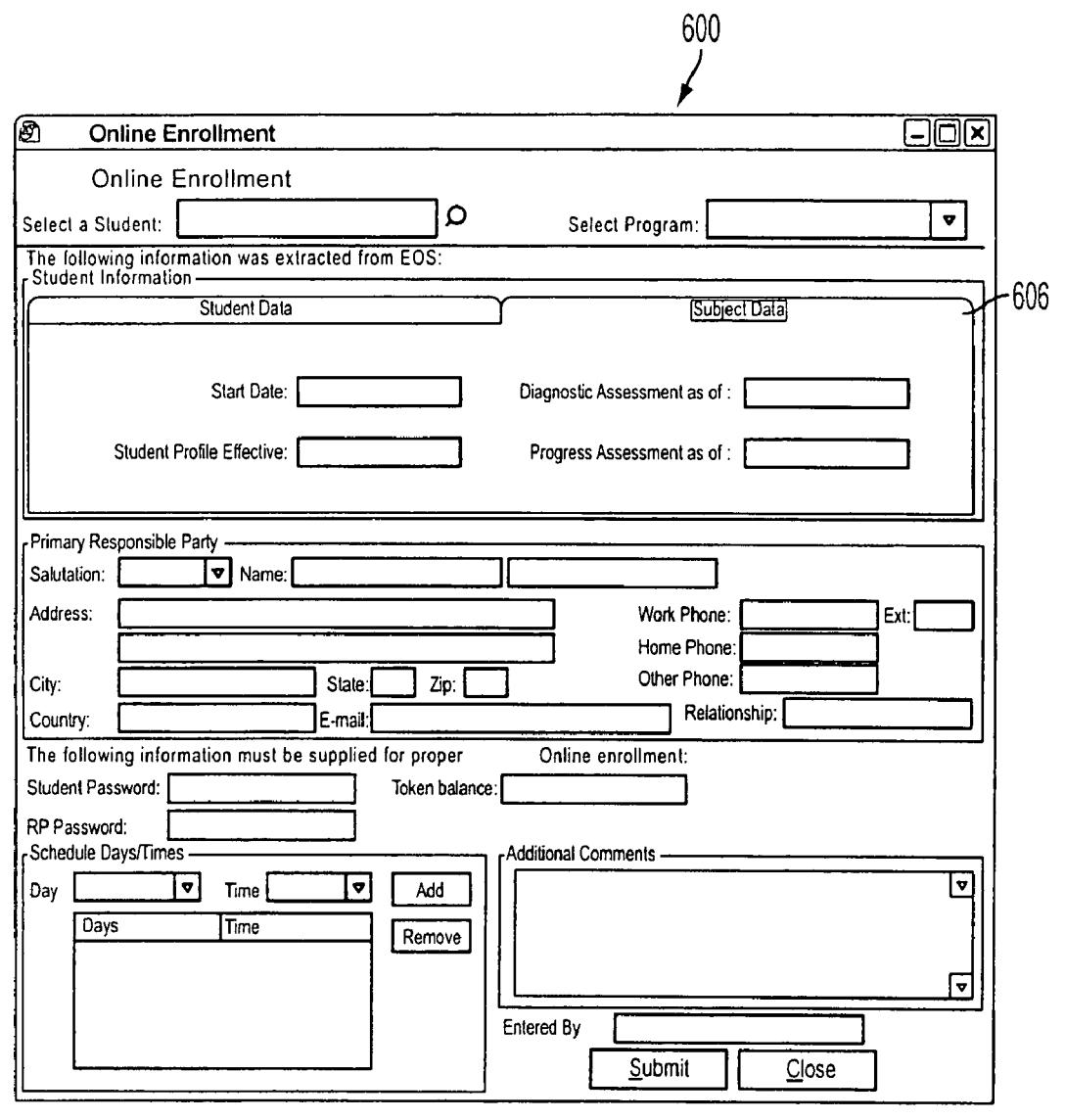

FIG. 6B shows the Enrollment screen 600 of FIG. 6A in which the subject data field 606 tab is selected by the enrollment administrator. The subject data field 606 displays the information relating to the online educational program that the student is being enrolled for. The subject data 606 information is retrieved from the EOU database 222, but can be modified by the enrollment administrator.

Figure 6C:
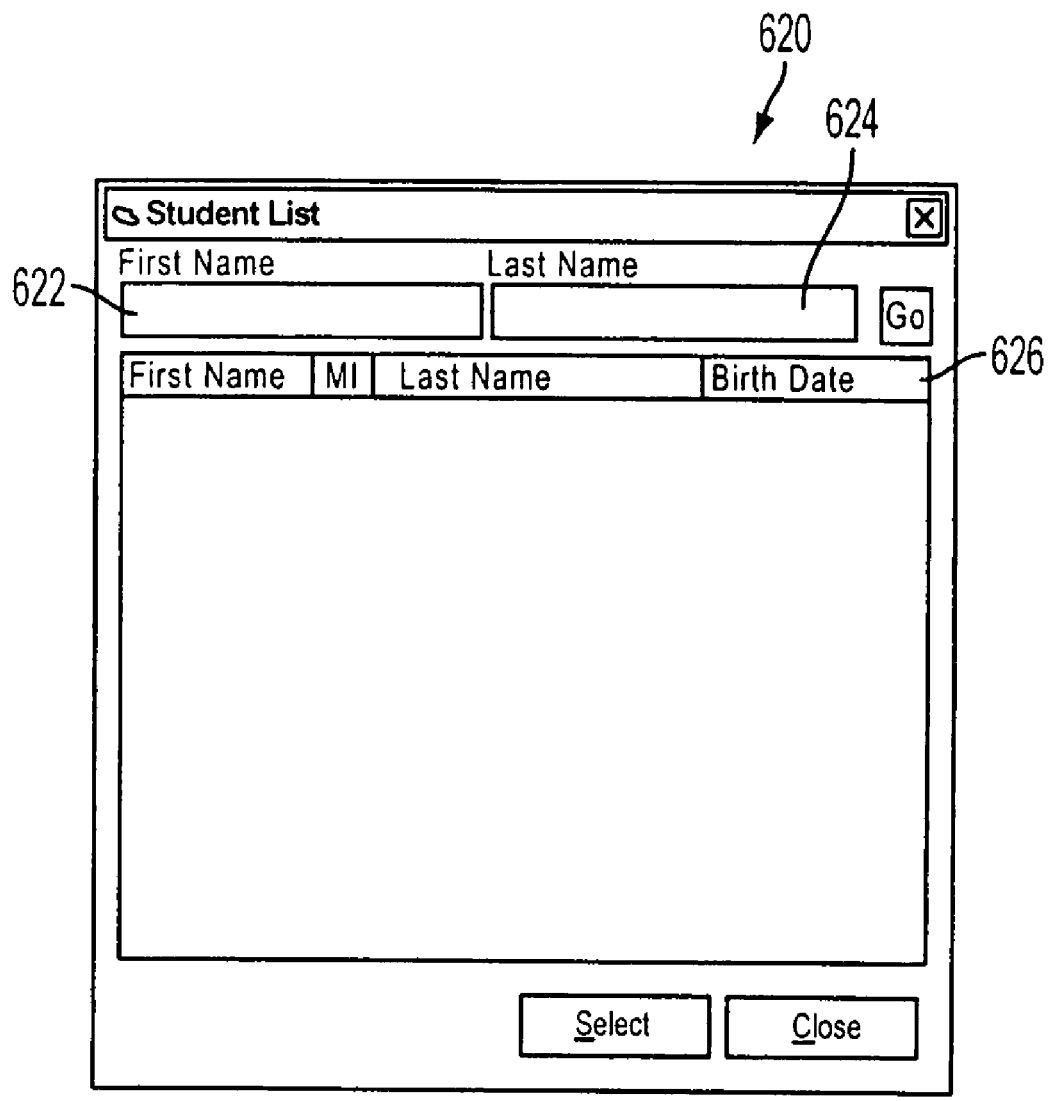

FIG. 6C shows an exemplary student selection box 620 of the enrollment utility according to an embodiment of the invention. In this embodiment, the selection box 620 includes a search field by student first name 622 and last name 624, as well as a display field 626 which lists the students first name, middle initial, last name, and birth date. The enrollment administrator may query a student first and/or last name in the search fields 622, 624. The enrollment utility then searches for students matching the queried name in the EOU database 222. In one embodiment, in order for a student to be included in the search query, he or she must be currently enrolled at the learning center. Also, in a further embodiment, the student must have taken an assessment test within a predefined time period, e.g., 5 months, before the data of online enrollment. In a yet further embodiment, only students who have not yet enrolled for any online learning programs are included in the search query. The enrollment administrator may select the student to enroll, and the student data is automatically retrieved from the EOU database 222.

Synchronization Utility

According to an embodiment of the invention, the system of the present invention is provided with a synchronization utility to synchronize student data, teacher data, responsible authority party data, and other data between the learning centers 104*a-c* and the online learning system 130 (shown in FIG. 1). The synchronization utility may be embodied within any node in the system, including the learning center servers 210, the online learning system 130, and/or the online learning portal 102. The synchronization utility can be invoked from any node to synchronize the data at that node or at another node. For example, a learning center may invoke the synchronization utility to update student data stored at the learning center EOU database 222, to update student data stored at the portal database 140, or to update student data at a database connected to the online learning system 130. Also, the synchronization utility can be invoked to update a single record, a plurality of records, or all database records. Further, the synchronization utility can be invoked automatically at predefined time intervals (e.g. hourly, daily, weekly, etc.), it can be invoked in real time by another process (e.g. the scheduling utility may invoke the synchronization utility during a student's scheduling), or in can be invoked manually (e.g. by a system administrator). Upon invocation, the synchronization utility uploads (and/or downloads) corresponding records from another database within the system into a database connected to the initiating node. This allows uniformity of data between the different nodes in the system.

Figure 7:
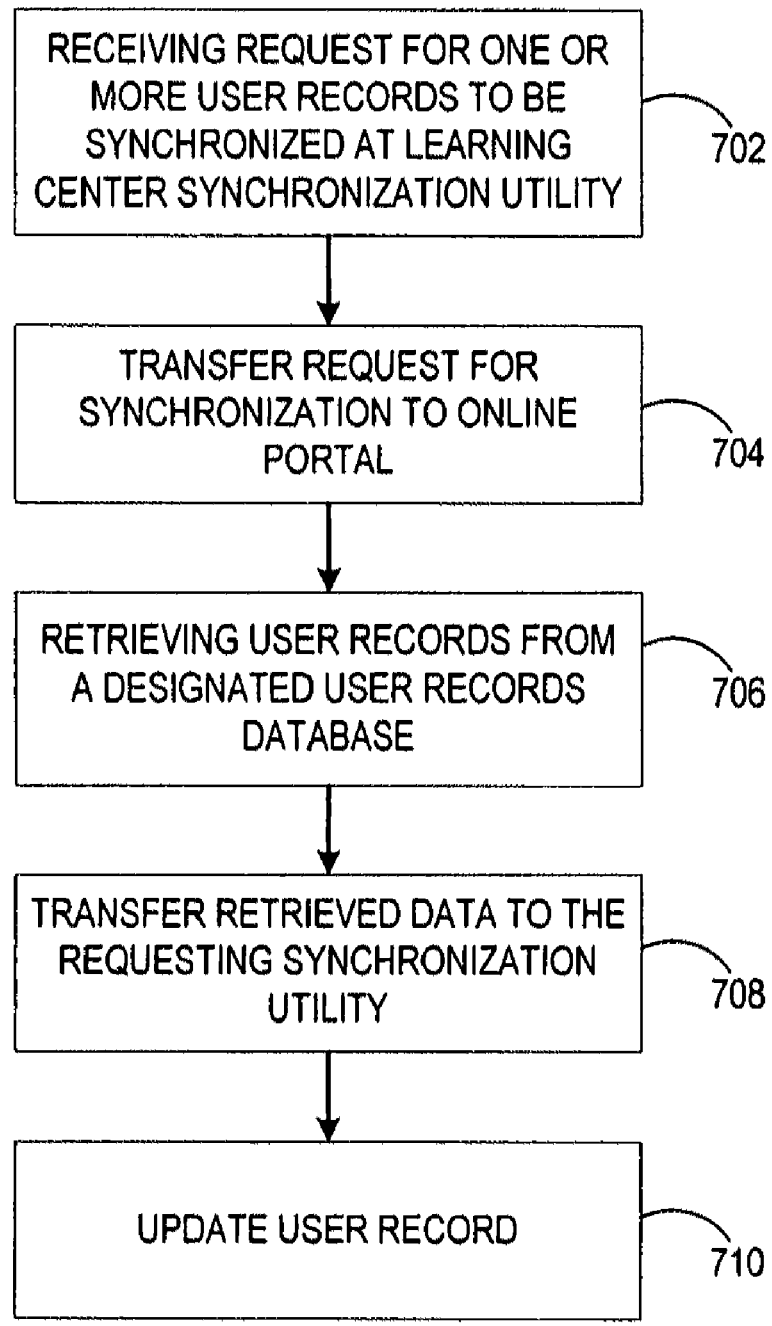
FIG. 7 shown an exemplary flow chart of a synchronization utility for synchronizing various data and information within the system.

FIG. 7 depicts an exemplary flow chart of the synchronization process according to an embodiment of the invention. In this embodiment, a user at a learning center (i.e. a synchronization administrator) accesses the synchronization utility on the learning center server 210 to start the synchronization process of a record related to a student, teacher, responsible authority, etc, block 702. In one embodiment, the request may specify a node from which the record is to be updated. For example, the synchronization administrator can specify that the record is to be synchronized with the portal data, the online system data, or data from other learning centers.

Upon receiving the request for record synchronization, the learning center's synchronization utility sends a request for synchronization of that record to the online learning portal 102, block 704. The online learning portal 102 then retrieves user records from the designated database, block 706. Thereafter, the online learning portal transfers the retrieved records to the synchronization utility of the requesting node, block 708, and the synchronization utility updates the records in the node's database, block 710.

In one embodiment, the online learning portal 102 sends a request to the designated node to retrieve the data from its database and send it back to the online learning portal 102. In yet another embodiment, the requesting node sends a request directly to the designated node for data, therefore bypassing the online learning portal 102. The extracted data may be transmitted as an XML string(s) and delivered back to the originating node. For added security, the strings may be encrypted before transmission and later decrypted at the originating node.

In one embodiment of the invention, the synchronization utility is configured to run at pre-set periods (e.g. daily) throughout the system to synchronize the online learning system 130 data with the data stored EOU database 222 and billing and scheduling databases 226, 228 at the various learning centers 104*a-c* (shown in FIGS. 1 and 2). This ensures the uniformity of data between the learning centers and the online learning system 130. The synchronization utility is also configured to run upon request from a user or a process. Therefore, in one embodiment, the start of a learning session invokes the synchronization utility to synchronize the data between the student's learning center and the online learning system 130.

Description of the Online Learning Environment

Figure 8:
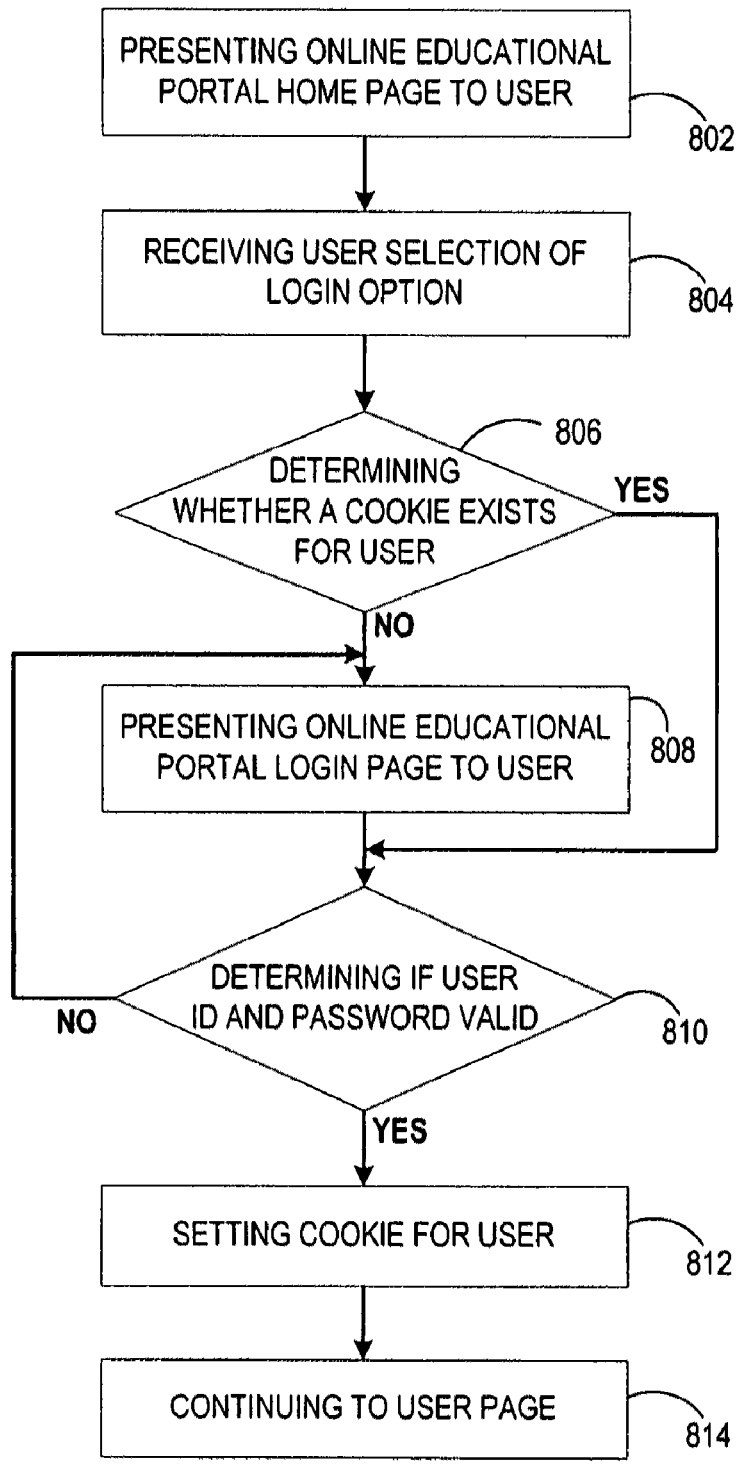
FIG. 8 shows an exemplary flow chart of the user login process.

FIG. 8 depicts an exemplary flow diagram of a process taken by the online learning portal 102 to log a user into the online learning system 130. The process begins by presenting the portal home page to the user, block 802. The user then selects a login option (e.g. student, parent, teacher, etc.), block 804. After the selection of a login option, the process determines whether a cookie exists for the user at the user's workstation, block 806. If not, the user is presented with a login screen, where they can put in their user ID and password, block 808. Thereafter, the user ID and password is authenticated, block 810, a cookie is set for the user, block 812, and the user is logged into the online learning portal, block 814. In one embodiment, each user ID is associated with a login option, so instead of presenting a user with a login option screen, user ID and password is authenticated and the login option is set thereafter.

Figure 9A:
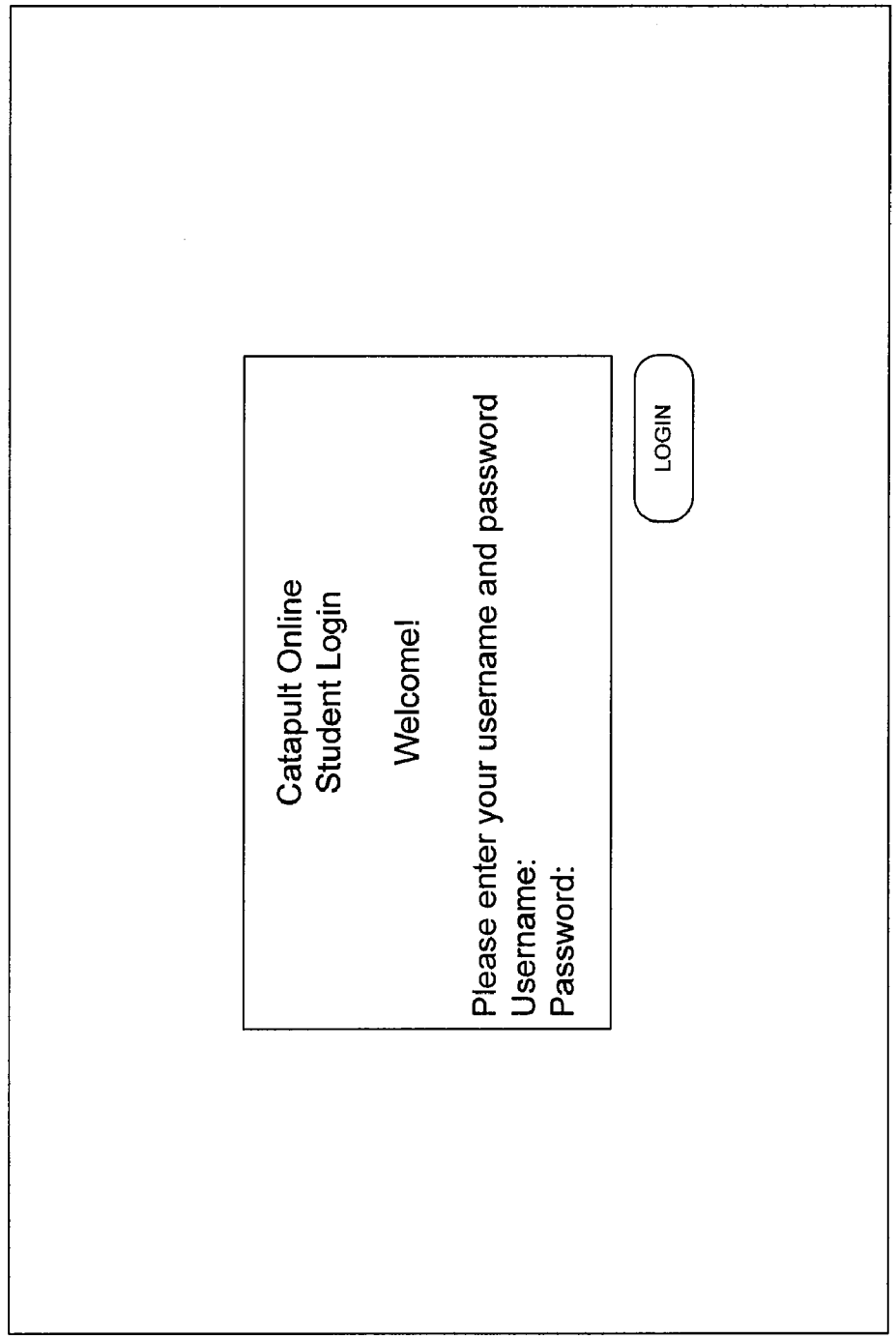

FIG. 9A depicts an exemplary student login page 900. FIG. 9B depicts an exemplary student page 920 where the student is directed to after successful login. The student page 920 includes a link 922 to the student's next scheduled session. If the student arrives at the session before the scheduled start time, the student is directed to a virtual community room with other students, where they can interact with or without teacher involvement. Once the learning session starts, the students are directed to a student learning session screen. FIG. 9C depicts an exemplary student learning session screen 940.

Figure 10A:
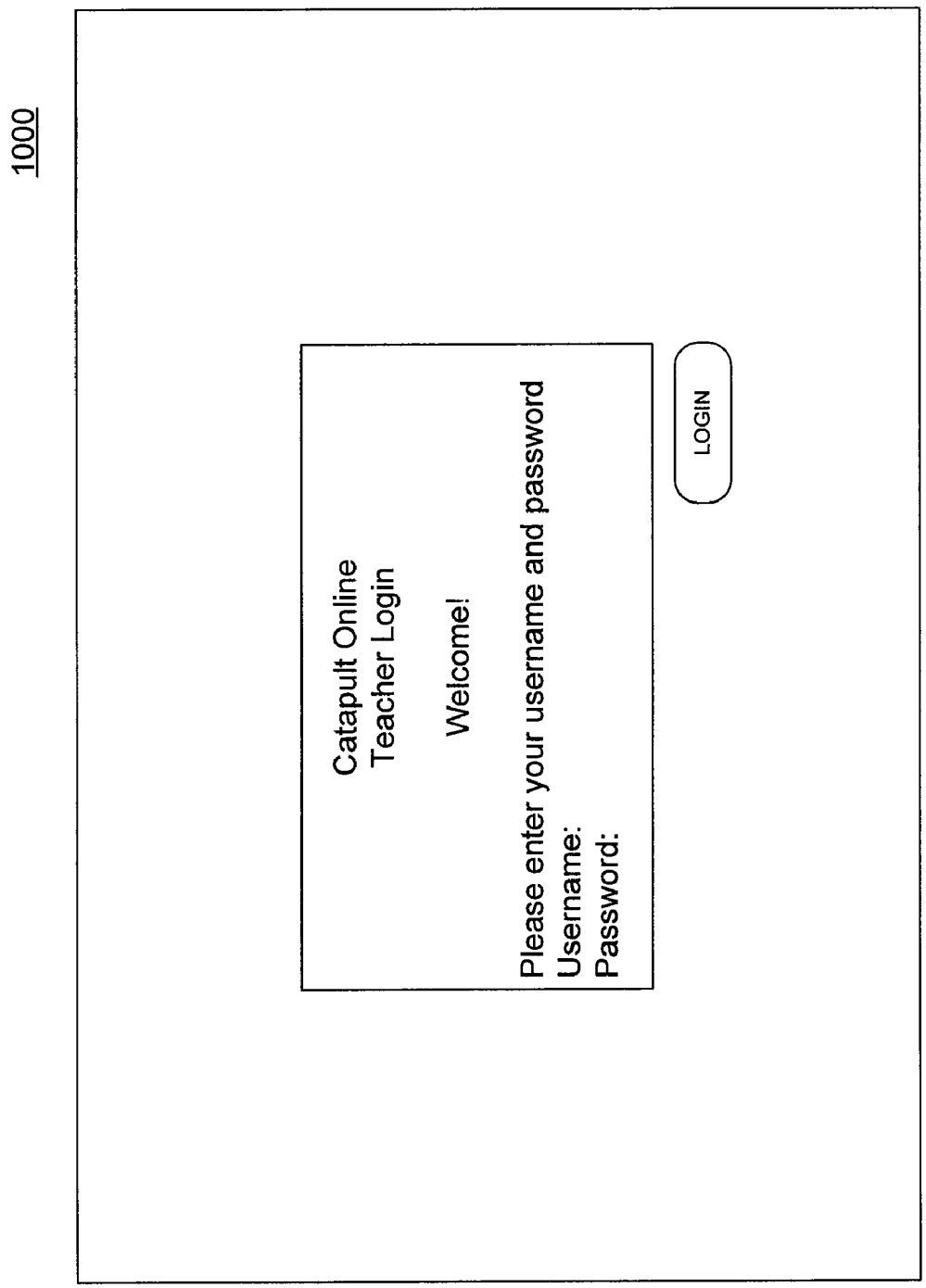

FIG. 10A depicts an exemplary teacher login page 1000 according to embodiments of the invention. FIG. 10B depicts an exemplary student page 1020 where the teacher is directed to after successful login. The teacher page 1020 includes a link 1022 to the teacher's next scheduled session. If the teacher arrives before the scheduled start time, the teacher is directed to the virtual community room. Once the learning session starts, the teacher is directed to a teacher learning session screen. FIG. 10C depicts an exemplary teacher learning session screen 1040, which includes a tab 1042 for each student present at the learning session. The teacher learning session screen 1040 also includes a left panel 1044, where the teacher can select instructional material to send to a student, grade the student's answer's, etc. The teacher learning session screen 1040 also includes a right panel 1046, where the teacher views the instructional material presented to the student, as well as the activities of the student.

Figure 11A:
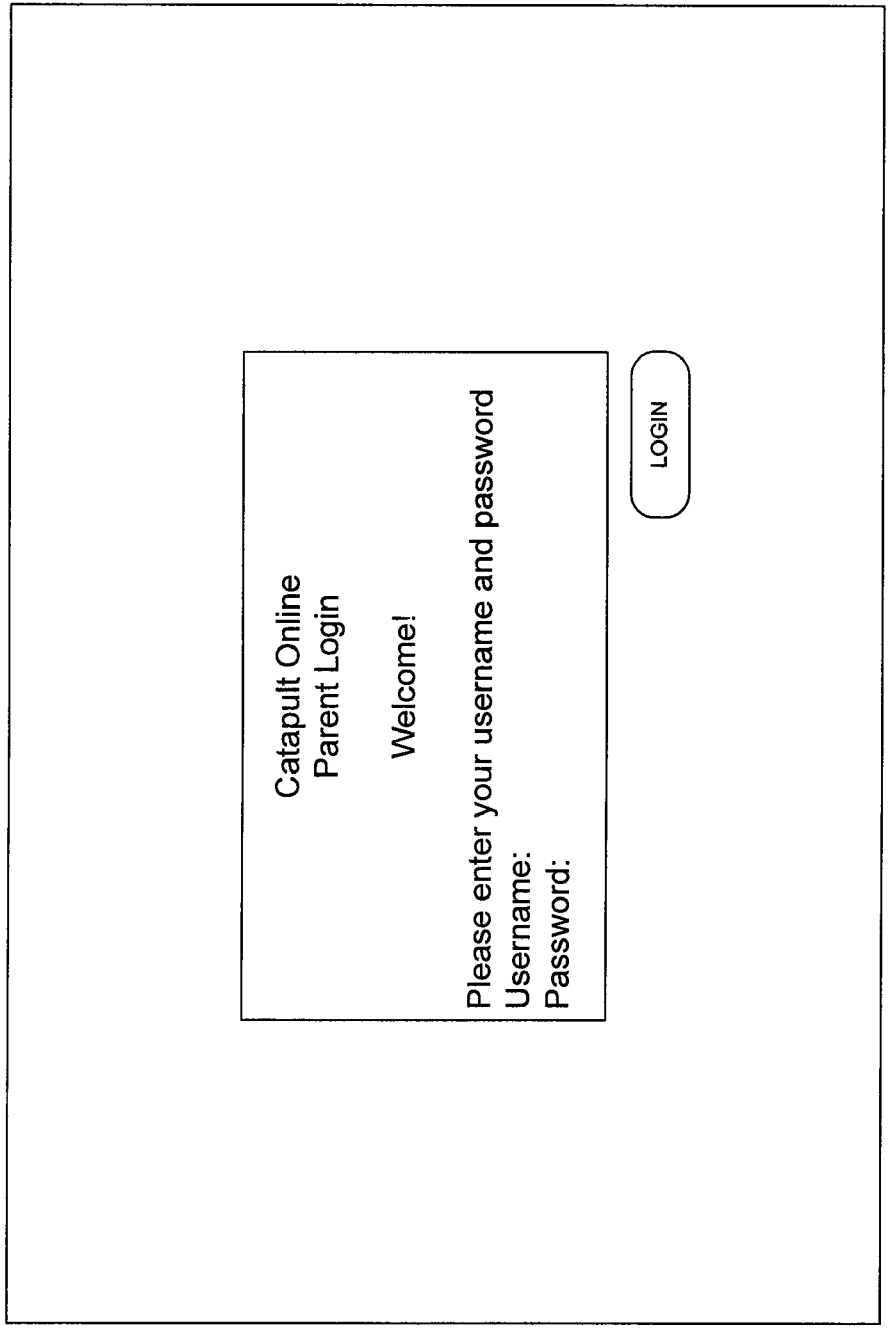

FIG. 11A depicts an exemplary responsible authority (e.g. parent) login page 1100 according to one embodiment. FIG. 11B depicts an exemplary responsible authority page 1120 where the responsible authority (in this case, the parent) is directed to after successful login. The responsible authority page 1120 includes a panel 1122, in which the parent can view the student's account, including the student's schedule, progress report, academic report, etc. The responsible authority can also change student password and schedule.

Virtual Community Rooms

According to one aspect of the present invention, the collaboration layer creates the virtual community room prior to the start of the learning sessions. A virtual community room can be any computer simulated environment created over a network that allows for interaction amongst plurality of students with or without a teacher. A virtual community room is created by interconnecting communication channel end points of the virtual community room participants to each other. Exemplary virtual community rooms comprise text, audio or video or media chat rooms where students interact with each other over a network with or without teacher involvement. Such virtual community rooms can be created prior to the start of a learning session or after a learning session ends. In this, the virtual community room becomes a transition classroom associated with the start of one learning session and the beginning of another learning session.

In one embodiment, the virtual community room is created for a virtual classroom at a predefined time period before the scheduled start time of a learning session (e.g., 15 minutes before the learning session). In this embodiment, as students and teachers are matched and assigned to a virtual classroom, they may enter the virtual community room. At the end of the learning session, the students may either log in or close the learning session, or they may remain in the virtual classroom. If they remain in the virtual classroom, they are automatically transferred from the learning session into the virtual community room.

In an alternate embodiment, all students and teachers are directed to a virtual community room upon login. In this embodiment, the virtual community room may be associated with a specific time spot. The students and teachers may wait in the virtual community room until they are matched with one another and are assigned a virtual classroom. At that point the students and teachers are transferred from the virtual community room into the learning sessions of their assigned virtual classrooms.

Student/Teacher Scheduling Utility

As previously discussed, a master schedule is created for a student at enrollment. A master schedule is similarly created for teachers based on teacher's availability and timing preference. The student and master schedule may be stored at any node within the network. For example, the student's master schedule may be stored at the student's learning center and the online learning system. Similarly, the teacher's master schedule may be stored at the online learning system. In one embodiment, in addition to the student and teacher's preference, other factors such as historic and statistical data relating to network traffic, teacher/student ratio, etc. is also accounted for in creating a teacher or student master schedule.

In one embodiment, a periodic (e.g. a weekly, bi-weekly, monthly, quarterly, etc.) schedule is set for each student and teacher based on their master schedule. A scheduling utility manages the periodic scheduling of students and teachers within the system. The period schedule outlines the class schedule for the teacher or student's following time period. In creating the period schedule, the scheduling utility accounts for statistical data such as the number of available teachers for a given time slot, the number of scheduled students for that time slot, the number of available teachers for a given subject matter for the given time slot, etc. The scheduling utility may also consider historical data such as historic ratio of teacher/student within that time slot.

In one embodiment, the scheduling utility uses historical data to calculate a predicted percentage of students that will not show up for a learning session within a specific time slot. For example, the scheduling utility may determine that based on historical data, 8% of students scheduled for math sessions on Mondays from 4-5 pm do not show up. Based on this prediction, the scheduling utility calculates a predicted number of students that will show up for the learning session. Thus, in the previous example, if 800 students are scheduled for math on Monday from 4-5 pm, the scheduling utility predicts that 64 of the 800 students will not show up. Based on this prediction, the scheduling utility schedules enough math teachers for only 736 students within that time slot. In a further embodiment, the scheduling utility also schedules a number of teachers as "on-call" so that in the event that the number of students that show up to the learning session exceeds the predicted number, the on-call teachers can be called upon to teach the additional students.

A scheduling utility run anywhere within the system that manages a scheduling database for storing and retrieving student and teacher schedules with respect to the learning sessions. Student schedules are stored in one or more student information databases that correlate students with registered learning session schedules. Teacher schedules are stored in one or more teacher information databases that correlate teachers' availability for teaching learning sessions. The scheduling utility also keeps track of all the changes made to the scheduling information of teachers and students.

Session Management Utility

Prior to the start of the learning sessions, a session management utility anywhere in the system runs a matching algorithm for matching students with teachers and assigning learning sessions to the students and teachers. For matching students with teachers, the matching algorithm takes into account various matching parameters. Exemplary matching parameters include, student attributes (e.g., age, grade, etc.), teacher attributes (e.g., skills, hourly rate, availability, etc.), historical and statistical data related to teacher and student availability and attendance parameters (e.g., "no show," "late", "available", "unavailable", etc.), preference attributes ("Preferred" or "Avoid") and learning session attributes (e.g., student/teacher ratios). After the a teacher is matched with one or more students, the teacher and students are assigned a learning session.

Figure 12:
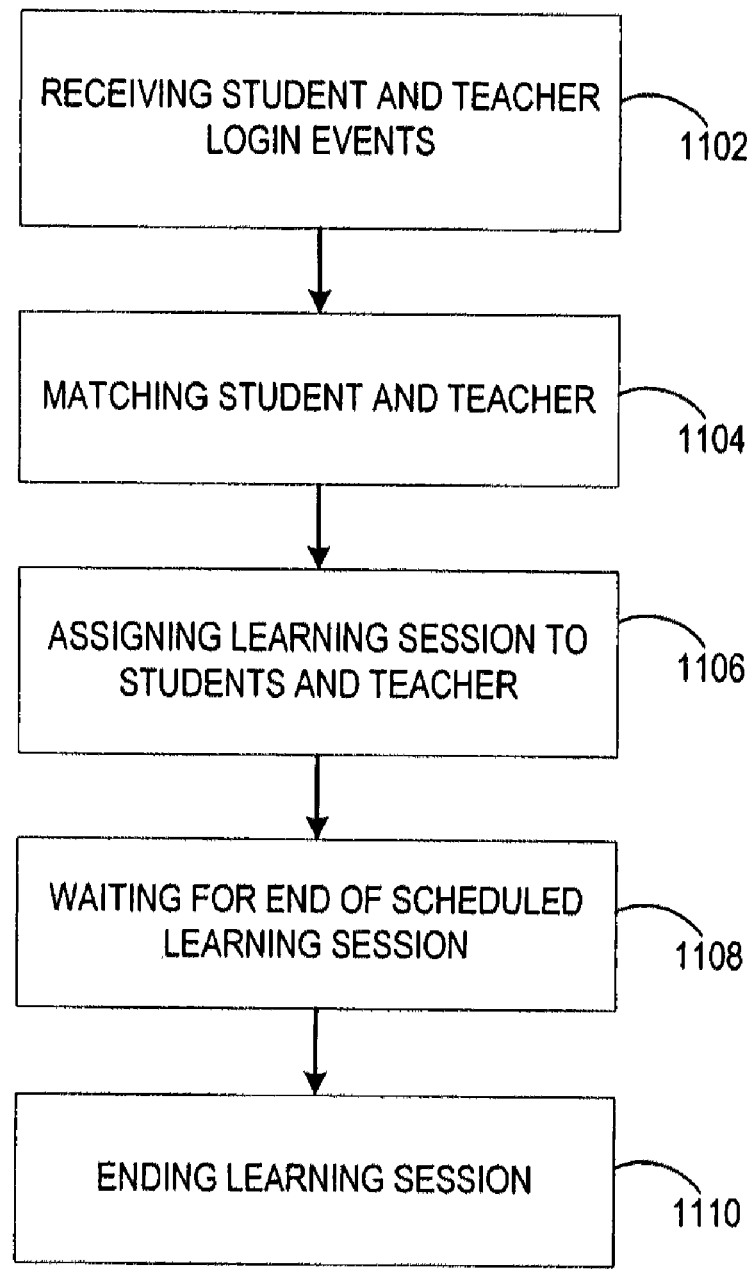
FIG. 12 is an exemplary flow diagram of the process taken by the session management utility placing teachers and students in appropriate learning sessions.
Figure 13:
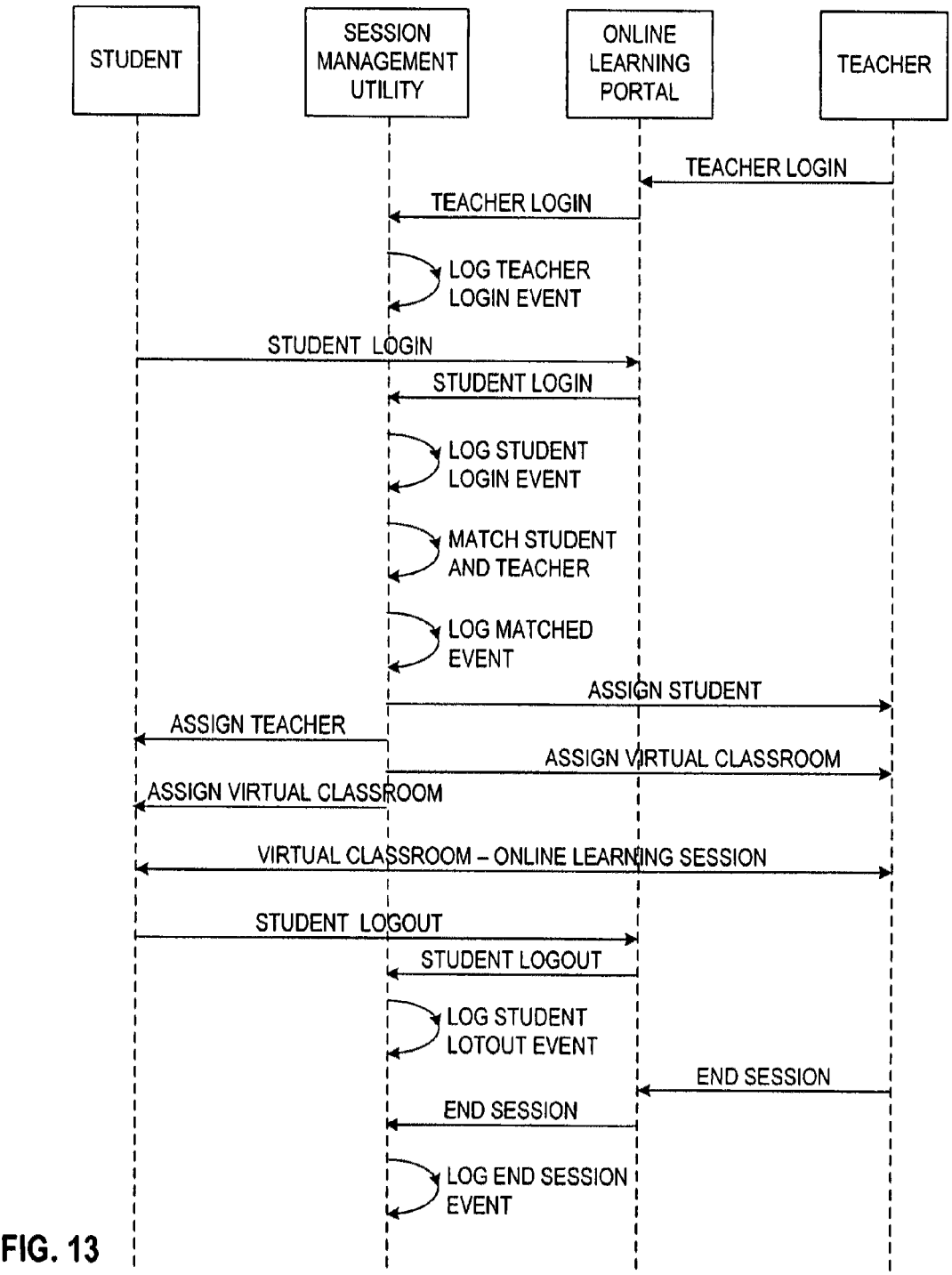
FIG. 13 is an exemplary sequence diagram of a session management process used in the system shown in FIG. 1.
Figure 14A:
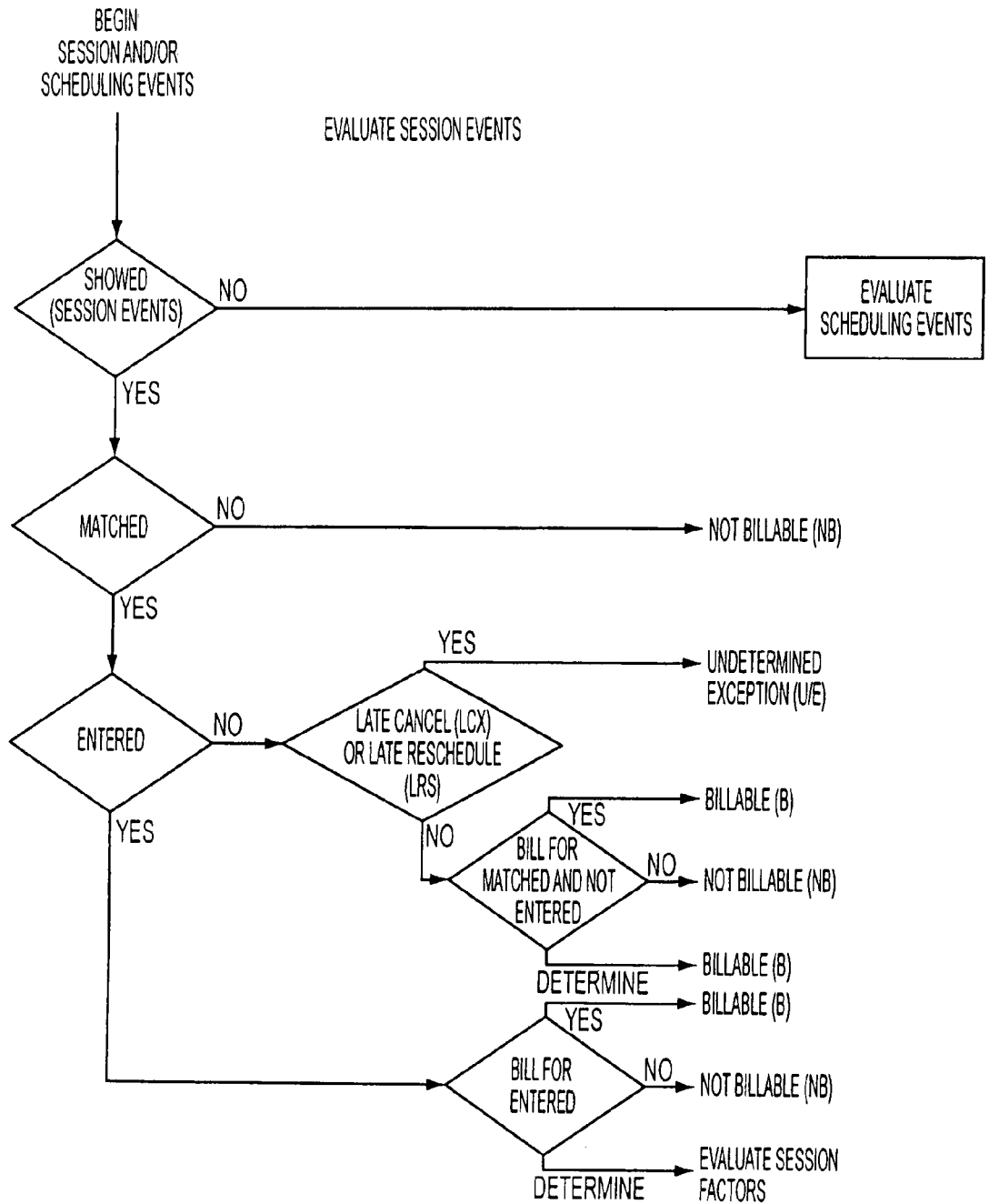
FIGS. 14A-E are exemplary flow charts implementing one embodiment of an accounting utility used in system of FIG. 1 for charging learning sessions to student accounts.
Figure 14B:
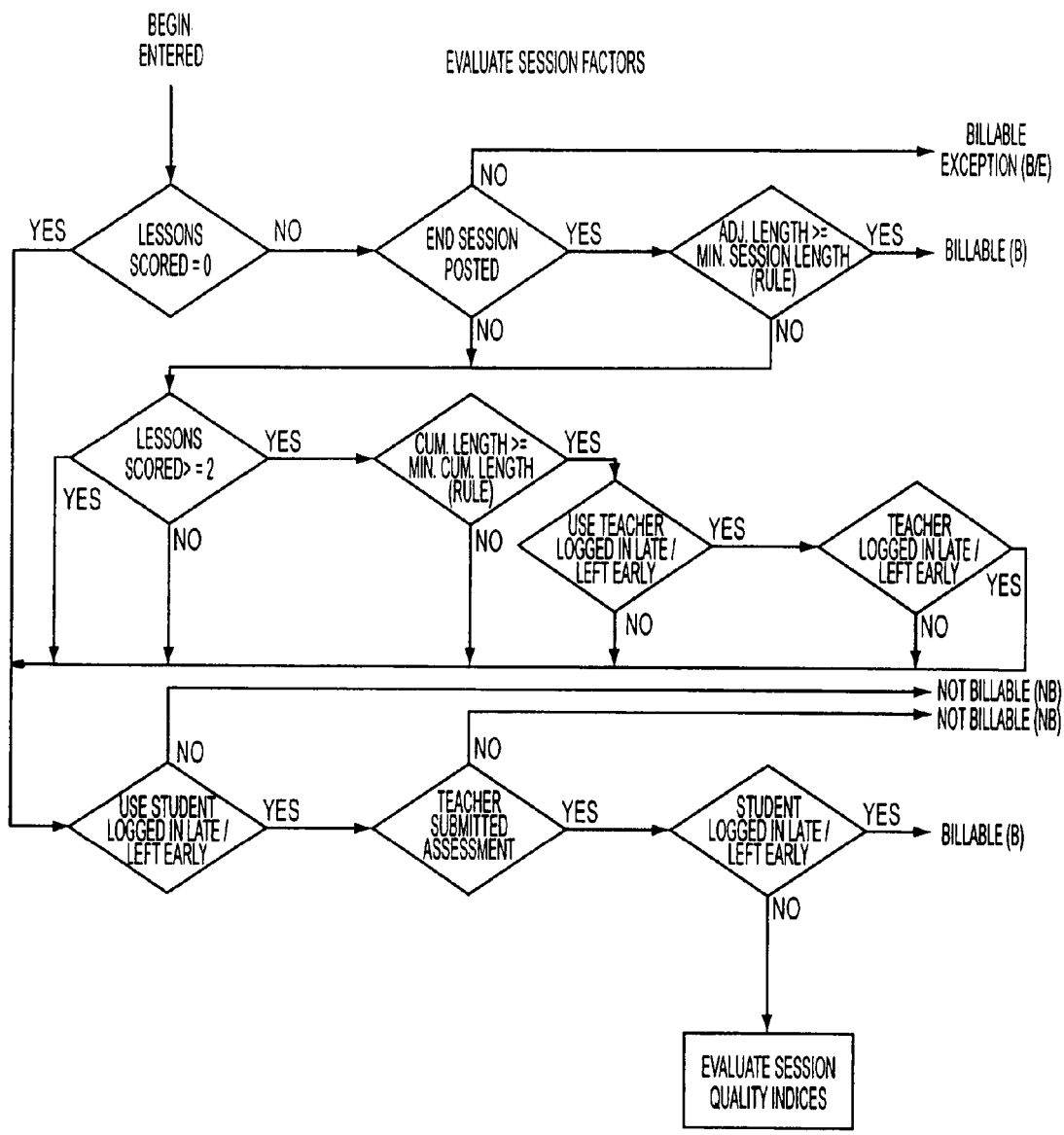
Figure 14C:
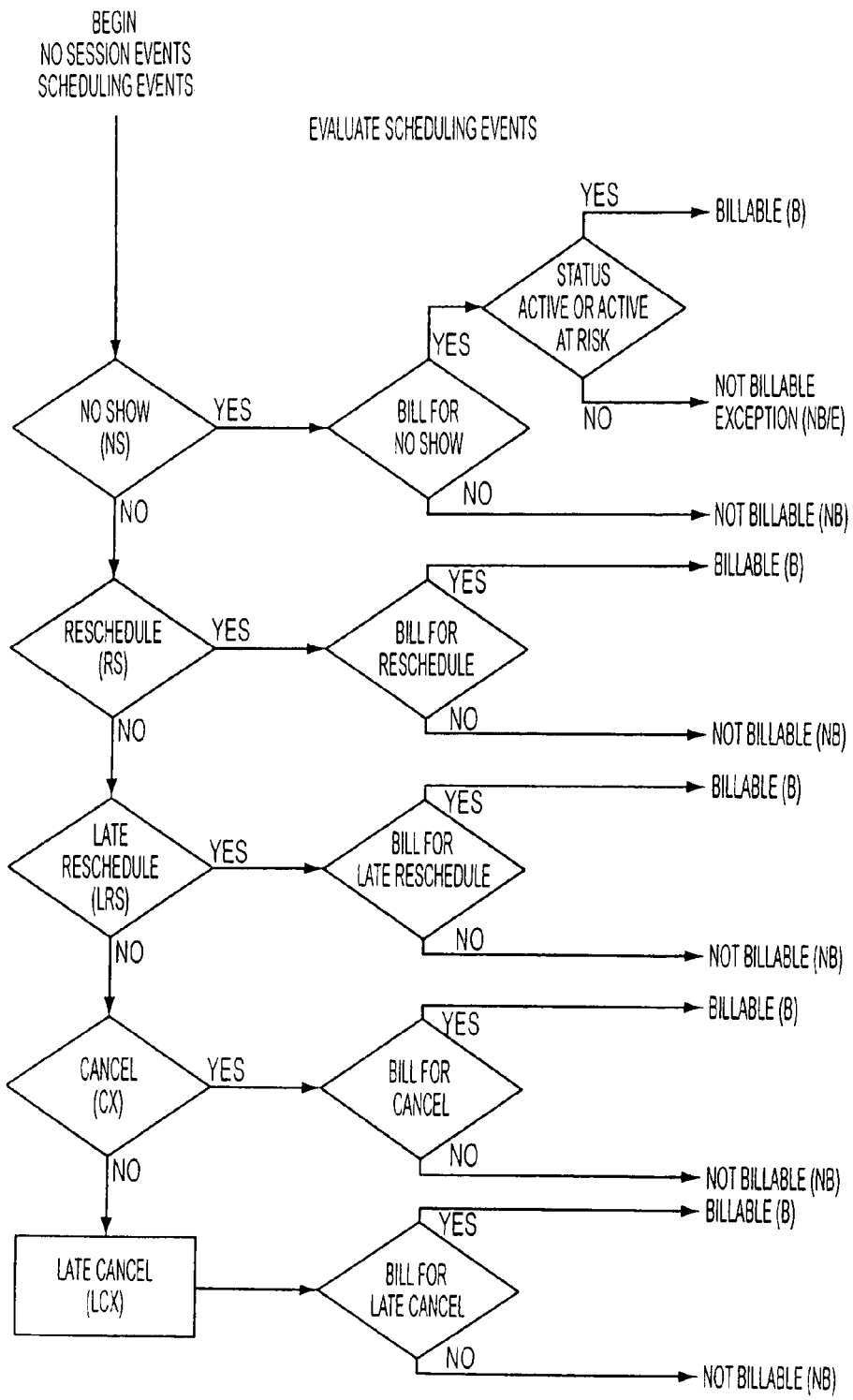
Figure 14D:
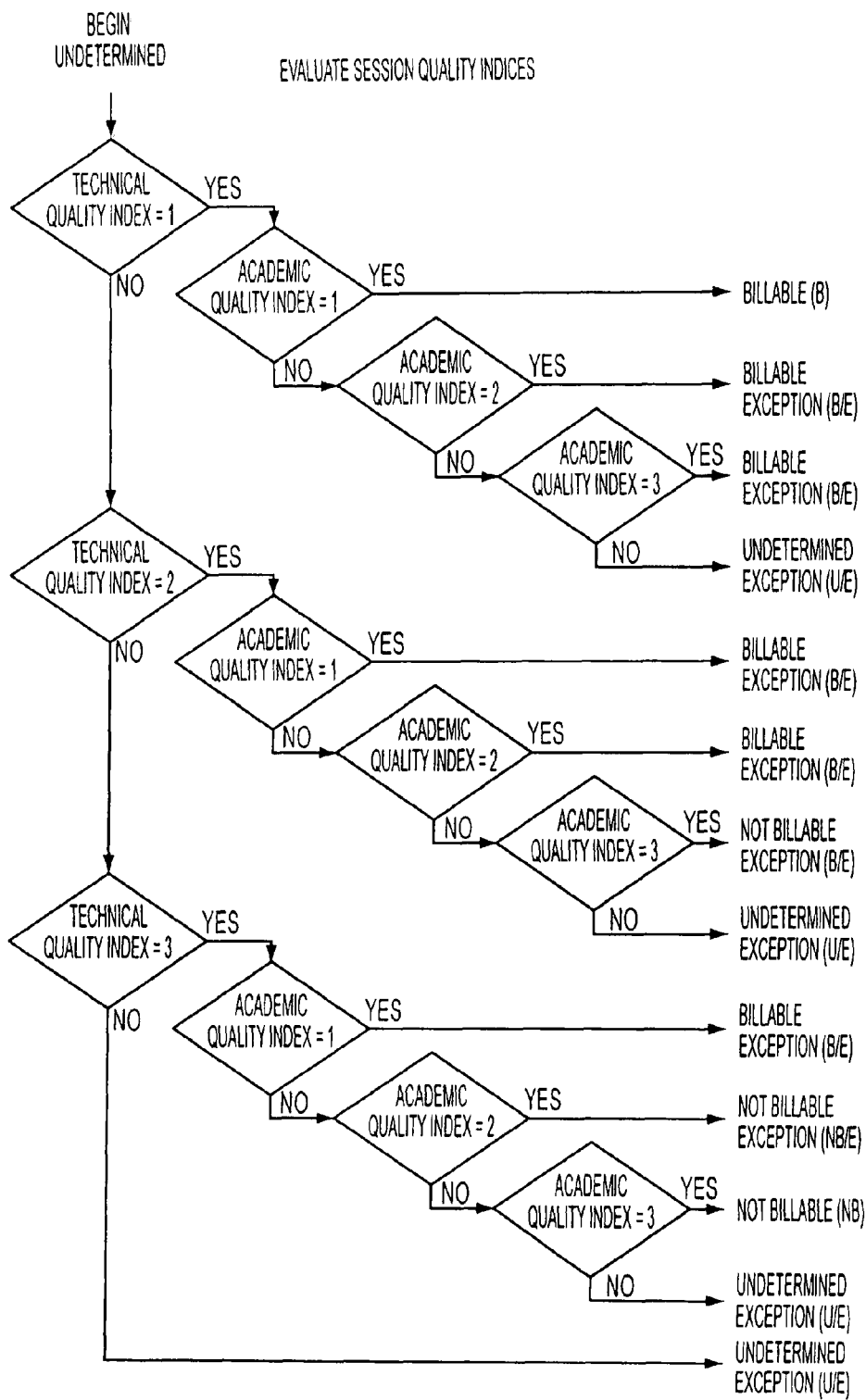
Figure 14E:
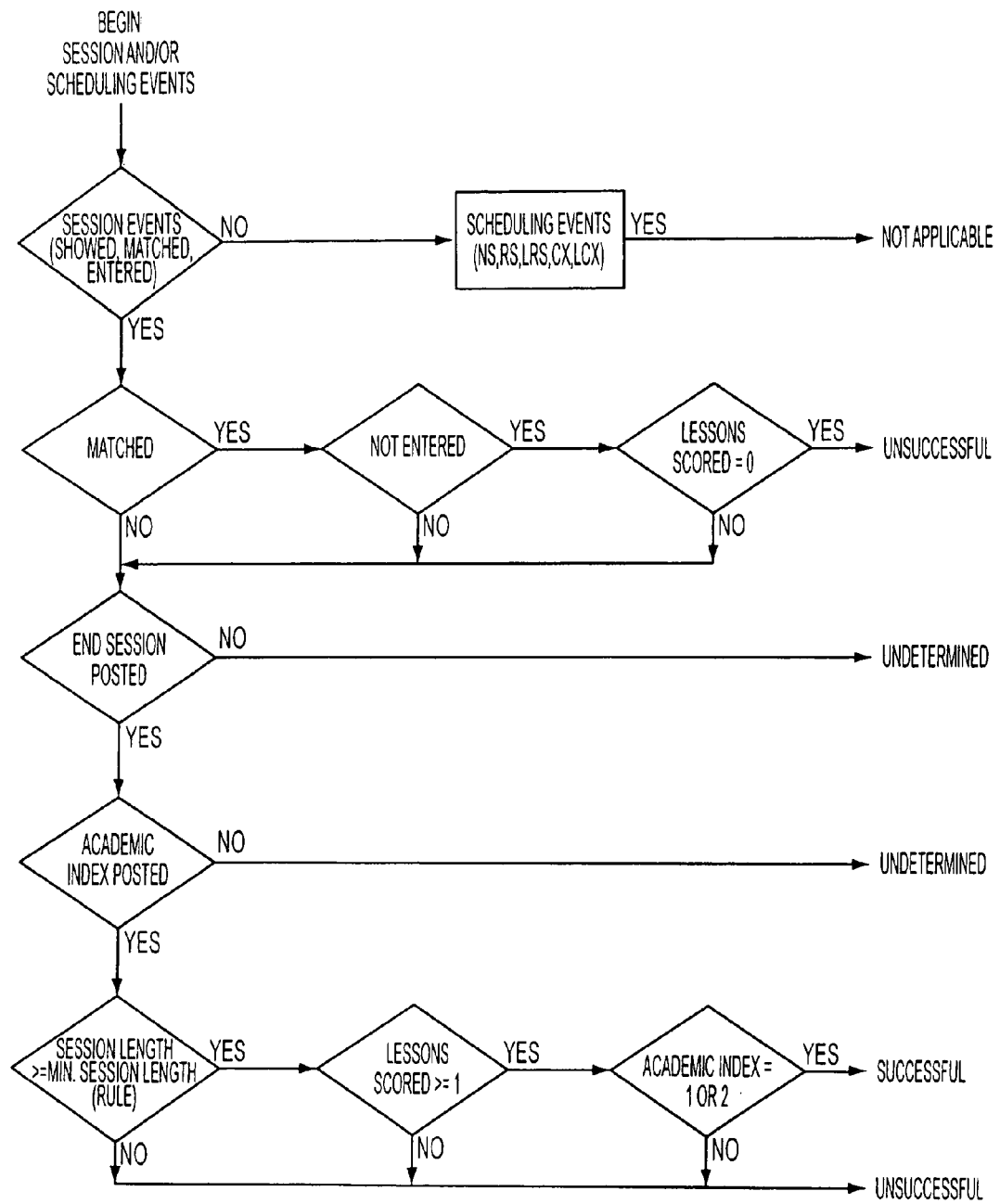

FIG. 12 shows an exemplary flow diagram of the process taken by the session management utility placing teachers and students in appropriate learning sessions. As students and teachers log in to the online learning portal 102 prior to the start of a scheduled learning session, that information is received by the session management utility, block 1102. The session management utility pairs or matches the students with teachers as they come in for a scheduled learning session based on the matching parameters discussed above, block 1104. The teacher and the students are then assigned a learning session (or a virtual classroom), block 1106. Thereafter, the learning session commenced at the scheduled start time and ends at the scheduled end time. The session management utility waits for the end of the learning session, block 1108, and terminates the learning session, block 1110. In an embodiment of the invention where a virtual community room is available before and after the learning session, the session management utility waits for the students an the teacher to log out before terminating the community room. An exemplary sequence diagram of the session management process is depicted is FIG. 13.

A load balancing node uses teacher preference attributes to balance teacher utilization loads statically or dynamically as such loads develop. In one embodiment, the teacher utilization load is balanced by the teacher selection controller in terms of teacher schedules and availability, among other things. In this way, teacher resources are used flexibly (either dynamically or statically) by assigning teachers to students that fit a teacher load balancing requirement. The online learning system also performs a capacity planning by determining how many sessions are to be held during a given time. The system then determines how many teachers are currently assigned for teaching during that given time. The system uses this data to determine how many more teachers are needed. By performing the capacity planning, the system arranges for scheduling more teachers during specific times ahead where teacher shortages are expected.

Each learning session has a defined set of "Events" that relate to student activity and conduct toward the learning session. In one embodiment, the Events are divided into a plurality of two groups: Session Events and Schedule Events. Exemplary Session Events are SHOWED (S), MATCHED (M), and ENTERED (E). SHOWED means that the student logged-in within a configured window around their scheduled session. MATCHED means that the student was matched with a teacher in the scheduling system and session record(s) have been created. ENTERED means that the student started the session, e.g., by clicking a "Begin Session" button on his or her transition page to get into the session. Exemplary Scheduling Events are Cancel (CX), Late Cancel (LCX), Reschedule (RS), Late Reschedule (LRS) and NoShow (NS). The scheduling system captures these Events.

Student Teacher Matching Based on Responsible Authority Rules

According to another aspect of the present invention, the matching of teachers to one or a group of students is based on attributes associated with the requirement of a responsible authority. For example, certain responsible authorities, e.g., one or more school districts, could require teachers having defined attributes to teach the students. Exemplary responsible authority defined attributes relate to parameters or rules associated with a teacher's certification, teacher's compliance with regulations, etc. One exemplary responsible authority rule may require teacher certification in certain skills, background criminal or security clearance (by FBI, National Security Agency (NSA), Department of Homeland security or their equivalents internationally), fields of education, or immunization for one or more diseases. A teacher selection node selects teachers based on responsible authority attributes and matches the selected teachers with students that are associated with the responsible authority.

Student Teacher Matching Based on Teacher Preference Attributes

According to another aspect of the present invention, the matching of teachers to one or a group of students is based on attributes associated with either students' preferences or responsible authority preferences with respect to a teacher. According to one embodiment of the invention, each teacher is categorized relative to a student's or responsible authority's preferences. Exemplary preference categories include "preferred," "not-preferred," or "avoid," etc. The preference attributes, either student's or his or her associated responsible authority's, are stored in student account records created after student enrollment. A suitably configured matching algorithm retrieves the preference attributes and based on scheduling information with the learning sessions matches students with preferred teachers prior to the start of the learning sessions. According to another aspect, teacher selection may be based on teacher's preference with respect to a student. Under this arrangement, each student can be categorized based on a teacher's preference attributes, which are taken into account during teacher student matching process.

Teacher Scheduling and Work Flow Management

Another aspect of the present invention relates to managing teacher work flow. In one embodiment of the present invention, the teacher information is entered into the scheduling system to generate teacher schedules for teaching one or more learning sessions. Exemplary teacher information include subject certification (e.g., math, reading etc.) along with availability data, (e.g., days and hours of the week that teacher is available to teach, etc.) If necessary, ratio capabilities, as well as fingerprint and background clearance specific information are taken into account for teacher scheduling. Once a teacher's schedule is generated, learning sessions can be added or deleted from the schedule. The schedule adjustments are made to meet an optimum teacher utilization requirement, for example, to reduce operating expenses of the learning system. Periodically, e.g., each week, student schedule information are processed relative to availability information stored in teacher schedules, taking into account student instructional need and preference attributes for matching teachers with students. The process also takes into account teacher conflict and excess information to determine if there enough teachers to support student schedules for all offered learning sessions during scheduled hours of the day. At defined time intervals, e.g., once a week, an automated master teacher schedule is generated and sent to the teachers via a communication mechanism such as an email advising them of their teaching assignment for an upcoming period, e.g., the following Sunday through Monday.

In one embodiment, corresponding teacher web pages display teacher schedules and assignment information for a defined period of time. The teachers are also provided with the ability to view new or additional scheduling needs that may arise after master schedules for a defined period are generated. Teachers wishing to be placed on schedules may nominate themselves by going to a teacher nominations site on their teacher web page. Nominated teachers can select desired times (e.g., days and/or hours) to be added to their schedule. The teacher nomination information is processed in view of new or revised scheduling requirements to generate a supplemental schedule on an as needed basis. By nominating themselves, in one embodiment, teachers agree to certain notification terms for teaching a scheduled learning session. In one embodiment, the nominated teachers agree to teach the learning session up to one hour prior to its scheduled time without any additional notification. In the event that the number of students scheduled for a particular hour decreases, schedule conflict and excess information are processed to remove teachers for teacher schedules as necessary.

Teacher Assignment Based on Student/Teacher Ratios Associated with a Plurality of Learning Sessions According to a teacher work flow management aspect of the present invention a system and method for assigning students to learning sessions determines teachers capability or qualification with respect to handling a range of student/teacher ratios during the learning sessions. More specifically, teacher assignment to a learning session associates teachers with one or more learning sessions through matching, scheduling or assignment. Each teacher is assigned an initial qualification parameter that can be adjusted based on future teaching assignments associated with teaching additional learning sessions. Each learning session has a corresponding student/teacher ratio. Exemplary student/teacher ratios are 1:1, 2:1, 3:1, 10:1, 20:1, etc. In order to teach during a learning session with a specific student/teacher ratio, the teacher requires a commensurate qualification parameter. Thus, the student/teacher ratio of the learning centers are associated with corresponding qualification parameters. In one embodiment, learning sessions with higher student/teacher ratios require teachers with higher teaching qualifications. According to this embodiment of the invention, the teaching qualifications are determined based on the number of learning sessions and the student/teacher ratios of the learning sessions associated with the teacher. In other words, a teacher who has conducted a larger number of learning sessions with a higher student/teacher ratios, e.g., 3:1, is determined to be more qualified than a teacher that has conducted a smaller number of lower student/teacher ratios, e.g., 1:1. Thus, the qualification parameters of the teachers can be characterized by the number of learning sessions and their associated student/teacher ratios. Processing the number of learning sessions taught by the teachers and the student/teacher ratios of the learning sessions results in determination of corresponding qualifications parameters. The qualification parameter of the teachers is adjusted as the number of associated learning sessions and the student/teacher ratios of the learning sessions change. For example, qualification parameter measures for a teacher increase with the increase in the number of learning sessions taught by the teacher as the teacher conducts more and more learning sessions. Furthermore, the qualification parameter measures for a teacher can increases with conducting learning sessions with higher student/teacher ratios. The present invention associates the teachers with learning sessions having respective student/teacher ratios to determine teacher qualification parameters that are adjusted over time to qualify teachers teaching lower student/teacher ratio learning sessions to teach during higher student/teacher ratio learning sessions.

The qualification parameters for teachers can be defined by any suitable qualitative and/or qualitative measures, such as scores, etc. Lets assume learning sessions with 1:1, 2:1, 3:1, 10:1, 20:1 ratios are assigned scores of 1, 2, 3, 10 and 20 respectively. A teacher having conducted ten (10) 1:1 learning sessions, five (5) 2:1 learning sessions and two (2) 3:1 learning sessions would have a qualification parameter score of twenty six (26) derived from the following (10*1+5*2+2*3). The present invention uses qualification rules for qualifying the teachers to teach in learning sessions with different student/teacher ratios. For example, a qualification score of zero (0) or more qualifies teaching in 1:1 learning session, score of 10 or more qualifies teaching in 2:1 learning sessions, score of 15 or more qualifies teaching in 3:1 learning sessions, score of 20 or more qualifies teaching in 10:1 learning sessions. The qualification rules set forth herein are exemplary and such rules can be designed to achieve any desired teacher utilization and work flow management objective. The system and method according to this aspect of the present invention assesses teacher's qualifications based on the number of previously taught learning sessions and their corresponding student/teacher ratios and moves their assignment qualifications for example from 1:1 sessions to 2:1 sessions and from 2:1 sessions to 3:1 sessions and so on. The movement order of such session assignment qualification can also be designed to achieve any desired teacher utilization and work flow management objective.

Session Billing Based on Third Party Attributes

An accounting block (or node anywhere in the system) creates student accounts based the Enrollment information received at suitable data entry nodes. A student account database contains student records correlated based on student Enrollment information for storing student account information. The accounting system also has a billing parameter database for storing billing parameters used for charging a responsible authority, such as a parent or another type responsible third party, which has responsibility for one or more student accounts. One responsible authority, such as a parent, may have responsibility for one student account. Another responsible authority, such as a public school district may have responsibility for thousands of student accounts. Examples of responsible authorities can include any type of governmental, public or private authorities. In an exemplary embodiment, the billing parameters are derived based on rules agreed to by a responsible authority. The rules define one or more criterion for charging a learning session to a student account. In one embodiment, the criterion for charging a learning session are related to a student's conduct or activity with respect to an enrolled learning session. An exemplary rule would allow charging a student account only if the student attends at least 30 minutes of an hour learning session, or shows for any portion of a session, late cancellation, etc. The system and method according to this aspect of the present invention also incorporates provisions for administrative override of the rules, allowing an administrator adjust charges and credits as necessary outside of the rules.

The accounting system therefore includes a billing parameter data entry node for receiving and recoding billing parameter information from responsible authorities. After enrollment, each student registers for one or more learning sessions in accordance with a schedule. A scheduler node associates each student account record with one or more registered learning sessions. A student activity data entry node receives information related to student activity with respect to the enrolled learning stations. The student activity information can be derived for example by determining whether a student starts a learning sessions as scheduled. The student activity information can be any information or data related to a student's conduct towards an enrolled learning session. Examples of student activity information include but are not limited to student attendance and progress information. For example, student attendance information can be categorized based on whether the student showed up to the learning session at all, time of attendance, duration of attendance, completion of a learning session, etc. Exemplary attendance categories are "no show," "late," "incomplete", "complete," "excused absence" or "unexcused absence." In one embodiment, certain attendance categories may be rescheduled, i.e., made up, with or without a charge in accordance with a set of makeup rules. Other examples of such makeup rules would allow for makeup sessions 1) within certain number of days (e.g., 7 days) of the original scheduled session, on the same subject, 2) if an excused absence 3) in case of force Majeure 3) in case of teacher unavailability or 3) no-show due to technical reasons. Other categories may be charged to a learning center, thereby allowing the learning center to decide whether to charge the student account or not. For example, the "unexcused absences" may be billed to the learning centers, but unexcused absences may be rescheduled. Other student activity information relate to a student's progress towards a learning objective. For example, teachers can enter student progress information based on student inputs or answers, test scores, teacher comments, etc. Progress information may also be retrieved automatically without teacher intervention based on student inputs alone. Under this arrangement, responsible authority may be billed on a student account may be charged if the student meets progress criteria agreed to with the responsible authority.

The accounting node processes Enrollment information and student activity information according to one or more retrieved billing parameters in order to determine charge information for each learning session. The charge information can be categorized based on charge amount, e.g., hourly rate, fixed fee rate, or by minute. The charge information can also relate to chargeability status defined by charge designation, such as "billable" or "non billable." An accounting node correlates charge information for each learning session with the student account information. The accounting node records the charge information in the corresponding student records. The accounting node then processes the charge information as needed for generating learning session billing information for the responsible authority, for example, hourly, daily, monthly, etc.

A method for administering a learning environment according to this embodiment of the invention, enters student Enrollment information for creating student account records and associates the student Enrollment information with one or more learning sessions. The method also enters student activity information and associates the student activity information with learning sessions. According to this method, student activity information are processed in accordance with the one or more billing parameters to determine charge information for each learning session based on the student activity information and the one or more billing parameters. The charge information are associated with the corresponding student records and processed for billing a responsible authority.

In one exemplary embodiment, one or more school districts are responsible authorities for a corresponding group of students. Each school district has billing rules included in a contract that governs administering educational programs to a group of students. According to this embodiment, every student is grouped under a contract, which defines the billing parameters for a billable learning session and a successful learning session.

A billing software processes the contract parameters in conjunction with the captured Events to determine if a student session is billable. The process requires retrieval of captured Schedule Events from the scheduling system. Based on the Schedule Events, the billing software creates Session Events (S,M,E) for any student session in the database that does not have corresponding entries. This can happen as a result of the disconnected process that creates those events. Finally, once all of the needed data is stored, the billing software applies the billing rules to determine if the learning session is billable or not.

Session Billing Based on Channel Activity

In another embodiment, the billing parameters are derived based on rules relating to monitored activities over communication channels used during the learning sessions. In this way, the criterion for charging a learning session are related to communications activities over the channels used during learning sessions. An exemplary embodiment monitors the communication channels and derive communication activity parameters. The communications activity parameters are used to charge a student account in accordance with pre-defined rules, for example if a session fails due to a bad connection.

A communications activity data entry node receives information related to communications activity during the learning sessions. The communications activity information can be any information or data related to data transfers (e.g., text, voice, video, image, control information packet transfers) as well channel quality attributes (e.g., text, voice, video, image quality, bit error rate, etc.). A processing node processes Enrollment information and channel activity information according to one or more retrieved channel activity related billing parameters in order to determine charge information for each learning session. The charge information can be categorized based on charge amount, e.g., hourly rate, fixed fee rate. The charge information can also relate to a chargeability status defined by a suitable charge designation, such as "billable" or "non billable." An accounting node correlates charge information for each learning session with the student account information. The accounting node records the charge information in the corresponding student records. The accounting node then processes the charge information as needed for generating learning session billing information for the responsible authority, for example, hourly, daily, monthly, etc.

Accordingly, a number of factors determine "billability" of a session. For example, for an institutional responsible authority, such as a school district Institutional, the charge rule may be a session length of a first defined length, (e.g., 15 minutes), and at least a first number of lessons scored (e.g., 1). For an individual responsible authority, e.g., a parent, a student session length of at least a second defined length (e.g., 45 minutes) may be required for charging the account where student being late or leaves early is counted in the session length. In addition, a second count numbers for lessons scored (e.g., 2) may be used for charging student accounts associated with an individual responsible authority. Thus, the charge rules for student accounts can be related to various types of responsible authority attributes. The charge rules associated with different types of responsible authority can apply corresponding rules for charging learning session where the student is a no-show. For example no-shows can be charged to the student accounts if student/responsible party does not cancel the session within a stipulated billing parameters, for example by noon time of the day a session is scheduled or a defined number of hours (e.g., three (3) hours) prior to a session start.

Learning session events can be cascaded to determine the ultimate billability of the learning session. Session and Schedule Events described above illustrate a typical cascading of applicable billing rules. A path that routes a session through determining session events, and session factors (e.g. lessons scored, session length, teacher submitting comments or assessment, and student logging in late or leaving) can be augmented by various session quality indices which take into account various technical (e.g. communication channel quality) and academic quality indicators (e.g. progress, etc.). If during the evaluation of billable status through session events, factors, and quality indices, it is determined that scheduling influences the billable status, these scheduling events and factors are worked into the billing rules criteria. In one embodiment, the billing rules are configured on a per student and per contract basis. So if for example Contract A allows for billable session that have 45 minutes and one lesson scored, yet Contract B requires 50 minutes, two lessons scored, and students master at least one skill, then sessions that are grouped under these contracts have their billable status set accordingly. FIGS. 14A-E are exemplary flow charts implementing one embodiment of an accounting utility used for charging learning sessions to student accounts.

Figure 15A:
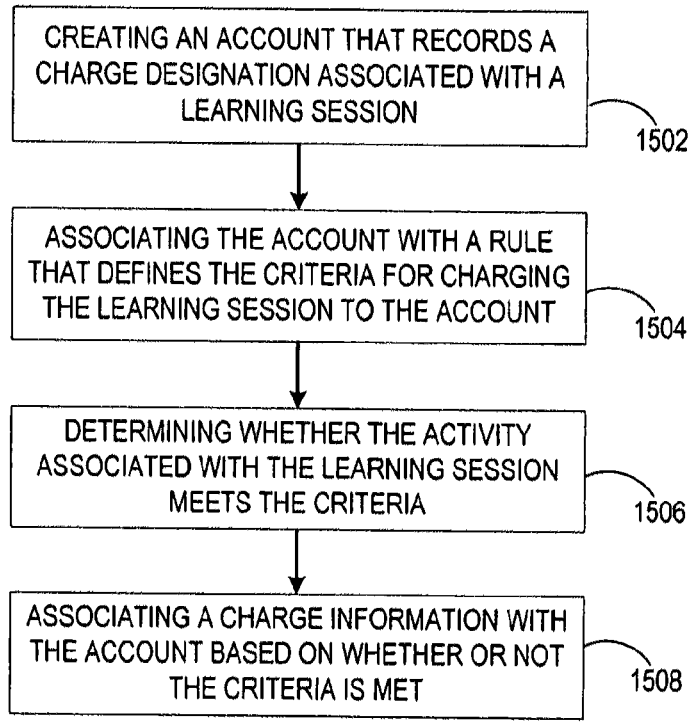
FIGS. 15A-B are exemplary flow diagrams of an activity based method of charging student accounts.

FIG. 15A is an exemplary flow diagram of an activity-based method for charging student accounts according to one embodiment of the invention. In FIG. 15A, an account that records a charge destination associated with a learning session is created, block 1502. Thereafter, the account is associated with a rule that defines the criteria for charging the learning session to the account, block 1504. Then, a determination is made as to whether the activity associated with the learning session meets the criteria, block 1506. A charge information is associated with the account based on whether or not the criteria is met, block 1508.

Figure 15B:
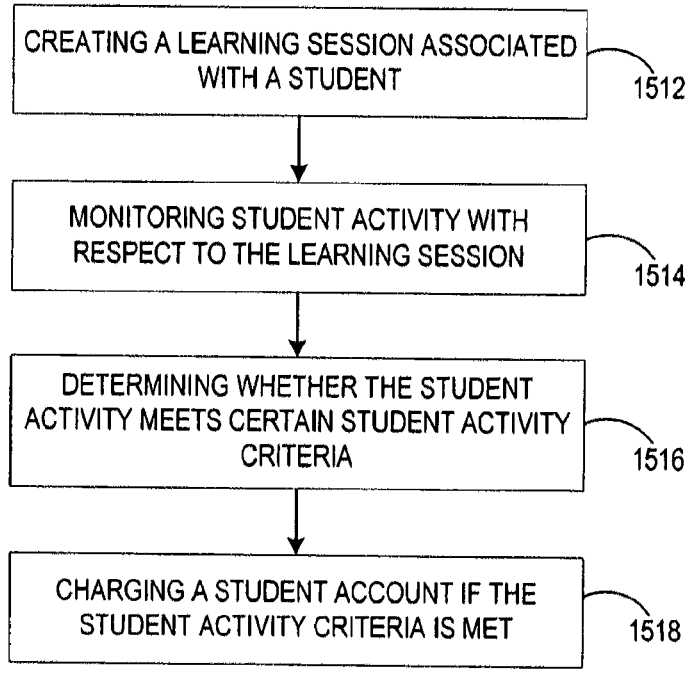

FIG. 15B is an exemplary flow diagram of an activity-based method for charging student accounts according to another embodiment of the invention. In FIG. 15B, a learning session associated with a student is created, block 1512. Thereafter, the student's activities with respect to the learning session is monitored, block 1514. A determination is made as to whether the student's activities meet certain student activity criteria, block 1516. If the student activity criteria is met, an account associated with the student is charged, block 1518.

From the foregoing it would be appreciated that a system for charging one ore learning session to one or more student accounts comprises an online learning system having one or more nodes that creates one or more online learning sessions over one or more communications channels between one or more students and corresponding teachers. An enrollment node receives student enrolment information. A scheduling node schedules the online learning session. A databases the stores information relating to one or more one or more charge criterion information for charging the one or more learning sessions to the one or more student accounts based on communications channel activity. An activity node receives communications channel activity information associated with one or more learning sessions, and an accounting node associates a charge information for a learning session to an student account based on the channel activity information and one or more charge criterion information. The charge information for the learning session is associated with the student account based on a determination of whether one or more communications channel activity associated with the learning session satisfy the one or more charge criterion. The communications channel activity information comprises at last one of a quantitative or qualitative measure of a communications channel parameter. A quantitative measure of a communications channel parameter relates to data rate, number of data units, number of received packets or number of transmitted packets. A qualitative measure of a communications channel parameter relates to data, voice, video or image quality parameter over a communications channel.

What is claimed is:

1. A computer program product including a non-transitory computer readable medium having one or more nodes including computer readable program code embodied thereon, said non-transitory computer readable program code adapted to be executed for charging one or more learning sessions to one or more student accounts, the computer program product comprising:

an online learning system having one or more nodes that creates one or more online learning sessions over one or more communications channels between one or more students and corresponding teachers;

an enrollment node that receives student enrollment information;

a scheduling node that schedules the one or more online learning sessions;

a database that stores information relating to one or more charge criterion information for charging the one or more online learning sessions to one or more student accounts based on communications channel activity;

an activity node for receiving communications channel activity information associated with the one or more online learning sessions; and an accounting node that associates a charge information for a learning session to a student account based on:
  (i) the communications channel activity occurring during the learning session, and
  (ii) the one or more charge criterion information, wherein the charge criterion relates to a number of lessons scored and a number of skills mastered.

2. The computer program product of claim 1, wherein the charge information for the learning session is associated with the student account based on a determination of whether one or more communications channel activity associated with the learning session satisfy the one or more charge criterion.

3. The computer program product of claim 1, wherein the communications channel activity information comprises at least one of a quantitative measure of a communications channel parameter or a qualitative measure of a communications channel parameter.

4. The computer program product of claim 3, wherein a quantitative measure of a communications channel parameter relates to at least one of data rate, number of data units, number of received packets or number of transmitted packets.

5. The computer program product of claim 3, wherein at least one of a qualitative measure of a communications channel parameter relates to at least one of a data, voice, video or image quality parameter over a communications channel.

* * * * *